US009791097B2

(12) United States Patent
Bowman et al.

(10) Patent No.: US 9,791,097 B2
(45) Date of Patent: Oct. 17, 2017

(54) ADJUSTABLE TABLET ARM WITH ONE-HANDED RELEASE MECHANISM

(71) Applicant: Innovative Office Products, LLC, Easton, PA (US)

(72) Inventors: Stephen J. Bowman, Allentown, PA (US); Peter J. Carrasquillo, Easton, PA (US); Michael P. Smith, Allentown, PA (US); Robert J. Cohn, Dallas, PA (US)

(73) Assignee: Innovative Office Products, LLC, Easton, PA (US)

( * ) Notice: Subject to any disclaimer, the term of this patent is extended or adjusted under 35 U.S.C. 154(b) by 0 days.

(21) Appl. No.: 15/028,524

(22) PCT Filed: Oct. 14, 2013

(86) PCT No.: PCT/US2013/064826
§ 371 (c)(1),
(2) Date: Apr. 11, 2016

(87) PCT Pub. No.: WO2015/057184
PCT Pub. Date: Apr. 23, 2015

(65) Prior Publication Data
US 2016/0312950 A1    Oct. 27, 2016

(51) Int. Cl.
*F16M 11/00* (2006.01)
*F16M 13/02* (2006.01)
(Continued)

(52) U.S. Cl.
CPC .......... *F16M 13/022* (2013.01); *F16M 11/14* (2013.01); *F16M 11/2014* (2013.01);
(Continued)

(58) Field of Classification Search
CPC .. F16M 13/00; F16M 2200/022; F16M 11/10; F16M 13/022; F16M 11/14
See application file for complete search history.

(56) References Cited

U.S. PATENT DOCUMENTS 1,279,323 A * 9/1918 Geisel ........................ A61J 9/06
248/103
3,627,244 A * 12/1971 Nicholas ............... A61J 9/0661
248/103
(Continued)

FOREIGN PATENT DOCUMENTS

DE    102010000950 A1    12/2010
DE    202011110152 U1    4/2013
(Continued)

OTHER PUBLICATIONS

European Patent Office, The International Search Report and the Written Opinion of the International Searching Authority, dated Aug. 21 2014, for PCT/US2013/064826.

*Primary Examiner* — Amy Sterling
(74) *Attorney, Agent, or Firm* — Design IP

(57) ABSTRACT

A position- and length-adjustable arm (10) for supporting a tablet computer or other electronic device that is capable of numerous adjustments as desired by the user, and that includes a magnetic tablet attachment assembly (32) that permits the user to remove the tablet computer from the tablet arm with one hand.

20 Claims, 15 Drawing Sheets

(51) Int. Cl.
*F16M 11/14* (2006.01)
*F16M 11/20* (2006.01)
*F16M 11/28* (2006.01)

(52) U.S. Cl.
CPC ..... *F16M 11/2021* (2013.01); *F16M 11/2035* (2013.01); *F16M 11/2092* (2013.01); *F16M 11/28* (2013.01); *F16M 2200/024* (2013.01); *F16M 2200/065* (2013.01)

(56) References Cited

U.S. PATENT DOCUMENTS

| | | | | |
|---|---|---|---|---|
| 4,890,950 A | * | 1/1990 | Yoo | E06C 1/32 |
| | | | | 16/328 |
| 5,022,617 A | | 6/1991 | Henderson | |
| 5,855,087 A | * | 1/1999 | Risinger | A01K 97/10 |
| | | | | 248/514 |
| 5,964,443 A | * | 10/1999 | Leveille | B60R 1/06 |
| | | | | 248/292.12 |
| 6,076,846 A | * | 6/2000 | Clardy | B62J 1/28 |
| | | | | 248/299.1 |
| 8,215,596 B2 | * | 7/2012 | Duan | F16M 11/10 |
| | | | | 16/337 |
| 2004/0232291 A1 | | 11/2004 | Carnevali | |
| 2006/0181637 A1 | | 8/2006 | Oddsen, Jr. et al. | |
| 2011/0255219 A1 | | 10/2011 | Ou | |
| 2012/0175474 A1 | | 7/2012 | Barnard et al. | |
| 2013/0068915 A1 | | 3/2013 | Yang | |
| 2013/0112841 A1 | | 5/2013 | Fan | |
| 2016/0347257 A1 | * | 12/2016 | Buchanan | B60R 11/02 |

FOREIGN PATENT DOCUMENTS

WO 2011156569 A1 12/2011
WO 2013138641 A1 9/2013

\* cited by examiner

ADJUSTABLE TABLET ARM WITH ONE-HANDED RELEASE MECHANISM

FIELD OF THE INVENTION

The present invention relates to apparatuses for supporting electronic devices, more particularly to position- and length-adjustable apparatuses for supporting electronic devices, for example tablet computers.

BACKGROUND

It is increasingly common for computer users to use a tablet computer, smartphone, or other smaller electronic device having a display screen as a supplemental computing device to a laptop or desktop computer while seated or standing at a desk. Like with larger monitors, it is ergonomically correct to have a supplemental electronic device kept at the user's eye-level. It is desirable, therefore, to have an apparatus that is sleek, unobtrusive, and position- and length-adjustable that can be used to support a supplemental computing device from a desktop or directly from a monitor arm or mount for holding a primary display device such that the supplemental computing device may be placed wherever the user would like it located with respect to the primary display device. Tablet computers are also being used with increased regularity as a user's sole computing device. In these applications, it remains desirable to have a support apparatus that is greatly adjustable according to the user's needs.

When not at his or her desk, a user will commonly use the tablet computer as a portable device. Therefore, it is desirable that a tablet arm safely support the tablet computer therefrom while at a workstation, but that it also permit the tablet computer to be quickly and easily removed from the tablet arm when the user desires to use the tablet computer as a portable electronic device.

From the foregoing, it is appreciated that there is a need for an adjustable tablet-support device with a quick-release function that addresses these and other problems.

SUMMARY OF THE INVENTION

In one respect, Applicant has developed a tablet arm having a magnetic tablet attachment assembly that is semi-permanently attached to the rear side of a tablet computer via an adhesive. The tablet attachment assembly includes a magnet and the distal end of the tablet arm includes a release plate having a metal attachment disc. The magnet of the tablet attachment assembly will adhere to the metal attachment disc of the tablet arm when it is desired to have the tablet computer attached to the tablet arm. The release plate of the tablet arm has a shape that contours away from the rear side of the tablet computer, thereby creating a gap or space between the outermost perimeter of the release plate and the rear side of the tablet computer. By gripping an edge of the tablet computer and the rear side of the release plate with a single hand and by pushing the tablet computer towards the release plate, the user can with a single hand free the magnet of the tablet attachment assembly from the metal attachment plate of the tablet arm, thereby releasing the tablet computer from the tablet arm. In this way, the user can with one hand quickly release the tablet computer from the tablet arm and carry the tablet computer away.

In another respect, Applicant has developed a position- and length-adjustable tablet arm that is capable of numerous adjustments as desired by the user. The tablet arm has a proximal arm member that is attached to a base member via a proximal joint, a distal arm member having an adjustment slot therein that is attached to the proximal arm member via a medial joint located at the distal end of the proximal arm member, and a tablet support means that is attached to the distal end of the distal arm member via a distal joint. When in a fully-stored position, the distal arm member is entirely stored within the proximal arm member in a telescoping arrangement. To increase the effective length of the tablet arm, the distal arm member is telescopically slid out from within the proximal arm member a desired distance. Once the distal arm member has been fully removed from within the proximal arm member, the distal arm member is free to rotate about the medial joint and/or the position of the medial joint within the adjustment slot in the distal arm member may be adjusted in order to change the effective length of the distal arm member. After the length of the distal arm member has been adjusted, rotation of the distal arm member about the medial joint (and hence in relation to the proximal arm member) remains possible. Said another way, in a first phase, the distal arm member is telescopically extendable/retractable within a slot formed in the proximal arm member when the distal arm member is oriented parallel to the proximal arm member; in a second phase, after it has been fully extended out of the slot formed in the proximal arm member, the distal arm member can be rotated so that it is non-parallel to the proximal arm member; and in a third phase, while the distal arm member is oriented non-parallel to the proximal arm member, the distal arm member can be retracted (i.e., its length can be adjusted) without sliding the distal arm member into the slot formed in the proximal arm member.

BRIEF DESCRIPTION OF THE DRAWINGS

The apparatuses and methods for a position- and length-adjustable tablet arm with one-handed release mechanism are further described with reference to the accompanying drawings, in which.

DETAILED DESCRIPTION OF THE PREFERRED EMBODIMENTS

Figure 1:
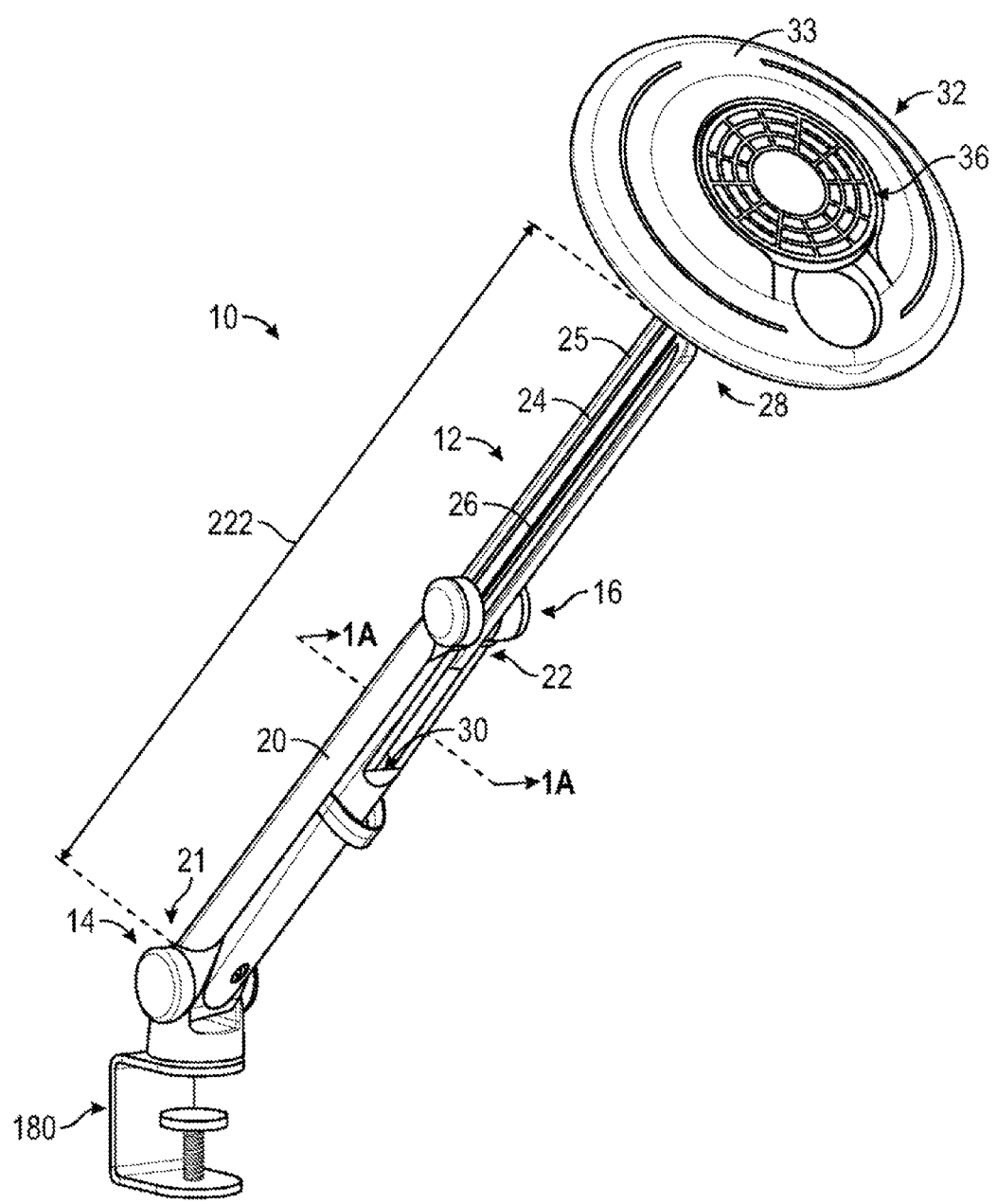
FIG. 1 is a perspective view of an embodiment of a tablet arm according to the present invention.

The ensuing detailed description provides preferred exemplary embodiments only, and is not intended to limit the scope, applicability, or configuration of the herein disclosed inventions. Rather, the ensuing detailed description of the preferred exemplary embodiments will provide those skilled in the art with an enabling description for implementing the preferred exemplary embodiments in accordance with the herein disclosed invention. It is understood that various changes may be made in the function and arrangement of elements without departing from the spirit and scope of the invention, as set forth in the appended claims.

To aid in describing the invention, directional terms may be used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification, in order to provide context for other features.

For purposes of the specification and claims, two lines, surfaces, or planes are considered to be "substantially parallel" to another when an absolute value of the measurement of the angle between the two lines, surfaces, or planes does not exceed 10 degrees.

For purposes of the specification and claims, a surface, opening, part, assembly, or portion thereof is to be considered "substantially planar" or lying "substantially in a plane" when at least 90% of the area thereof lies in a single plane.

Figure 1A:
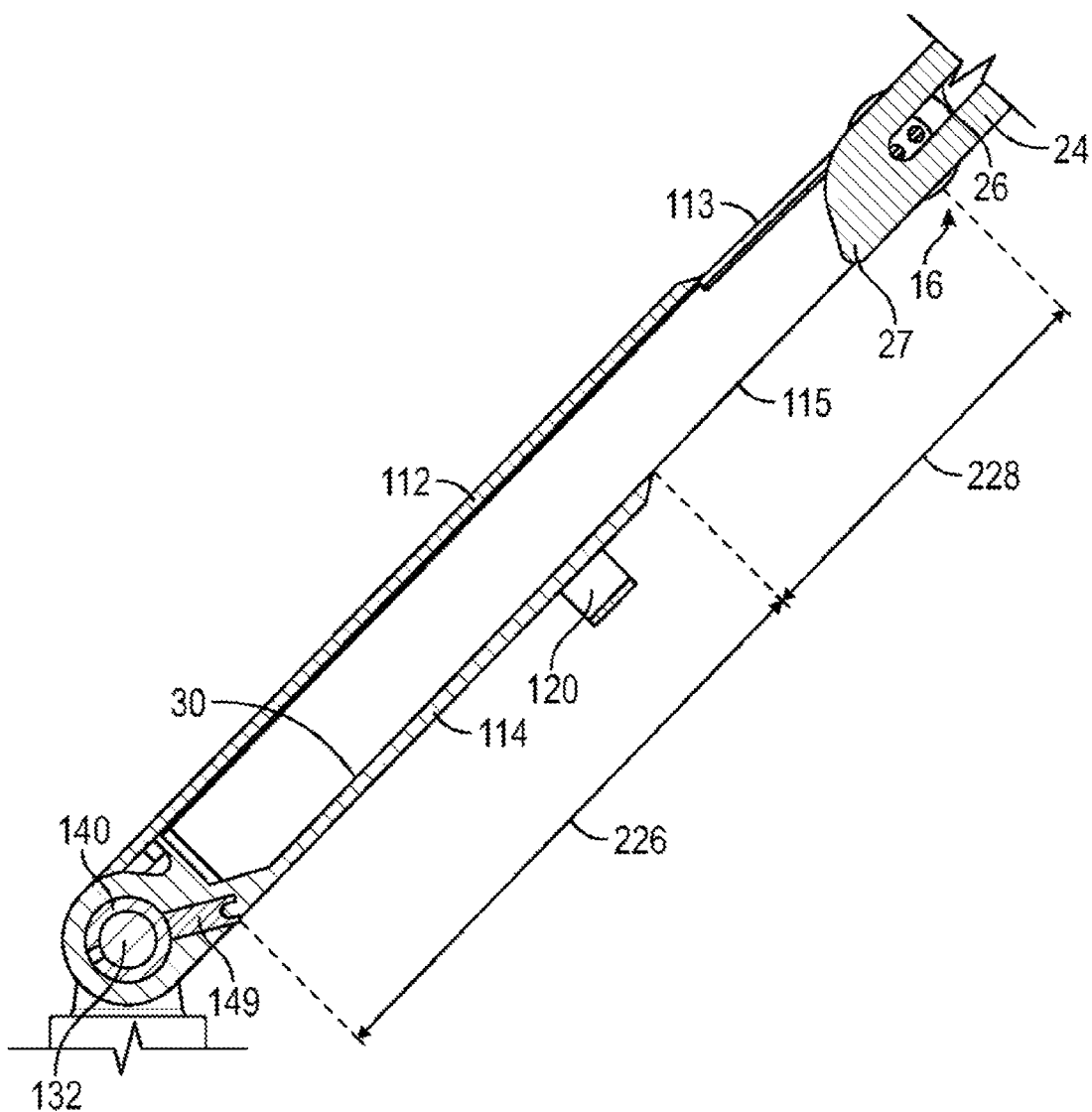
FIG. 1A is a partial sectional view taken along line 1A-1A of FIG. 1.

The present application is directed to apparatuses and methods for a position- and length-adjustable tablet arm having a one-handed release mechanism. FIGS. 1-11, 13, and 14 generally show an embodiment of a tablet arm 10 according to the present invention. With reference to FIG. 1, the tablet arm 10 includes an arm assembly 12 that includes a proximal arm member 20 that is attached at its proximal end 21 to a base mount 180 via a proximal joint 14, a distal arm member 24 that is attached to the distal end 22 of the proximal arm member 20 via a medial joint 16, and a tablet attachment assembly 32 that is attached to the distal end 28 of the distal arm member 24 by a distal joint 18 (see FIGS. 3 and 4). FIG. 1 shows the tablet arm 10 in a configuration in which the distal arm member 24 is fully extended from out of the stowage slot 30 that is located within the proximal arm member 20, but wherein the longitudinal axis 31 of the distal arm member 24 is arranged parallel to the longitudinal axis 23 of the proximal arm member 20 (see FIG. 14). The stowage slot 30 is preferably complementary in shape to the distal arm member 24, and includes a concealed portion 226 and an unconcealed portion 228 (see FIG. 1A). The concealed portion 226 is that portion of the stowage slot 30 located below the lower channel gap 115 (when moving towards the proximal joint 14), and the unconcealed portion 228 is that portion of the stowage slot 30 located above the lower channel gap 115 (when moving towards the medial joint 16). The position and length adjustability of the tablet arm 10 will be described in further detail below with respect to FIGS. 13 and 14.

Figure 2:
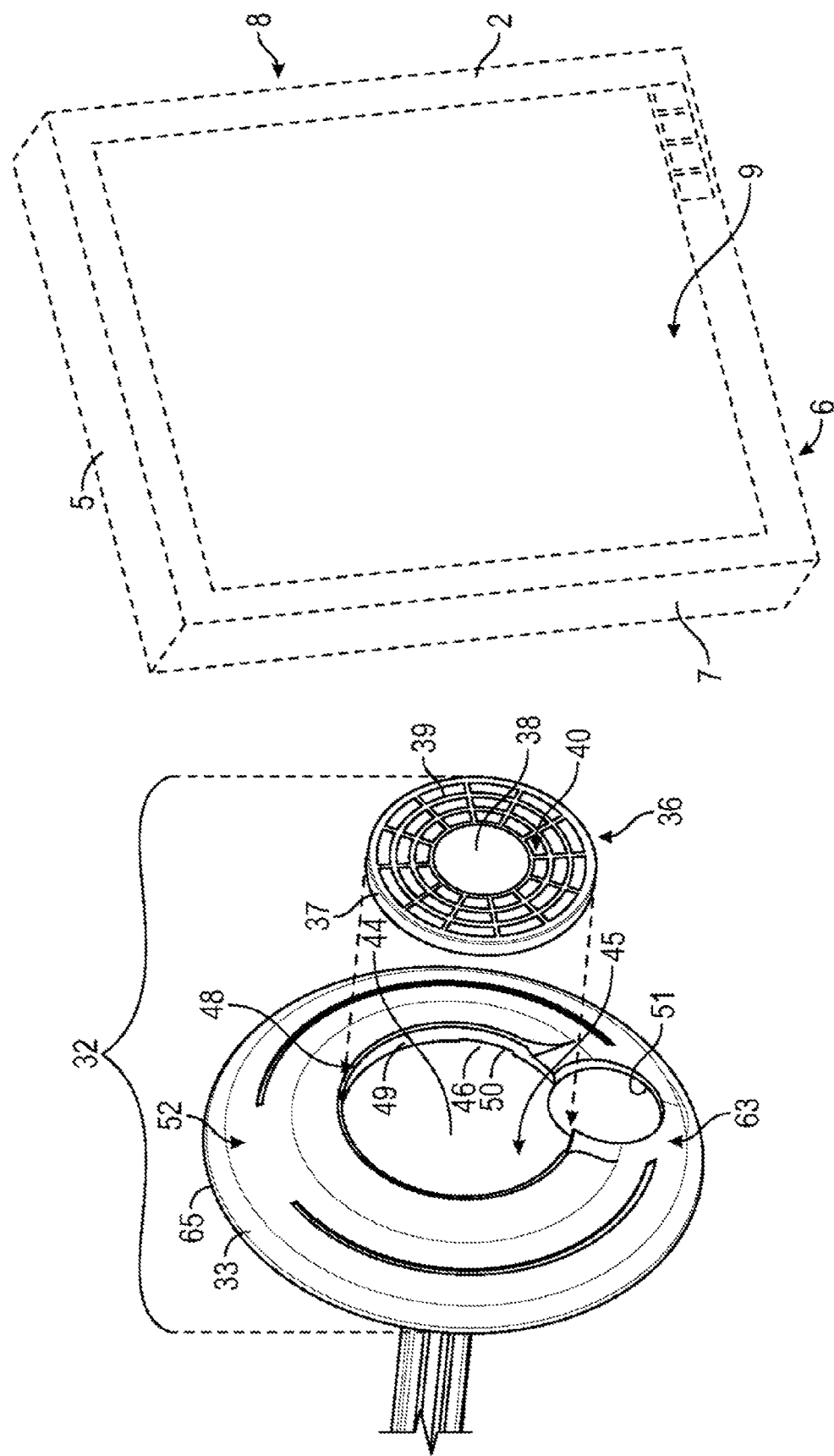
FIGS. 2 and 3 are close-up views of the distal end of the tablet arm of FIG. 1, showing the connection means to an exemplary tablet computer.
Figure 3:
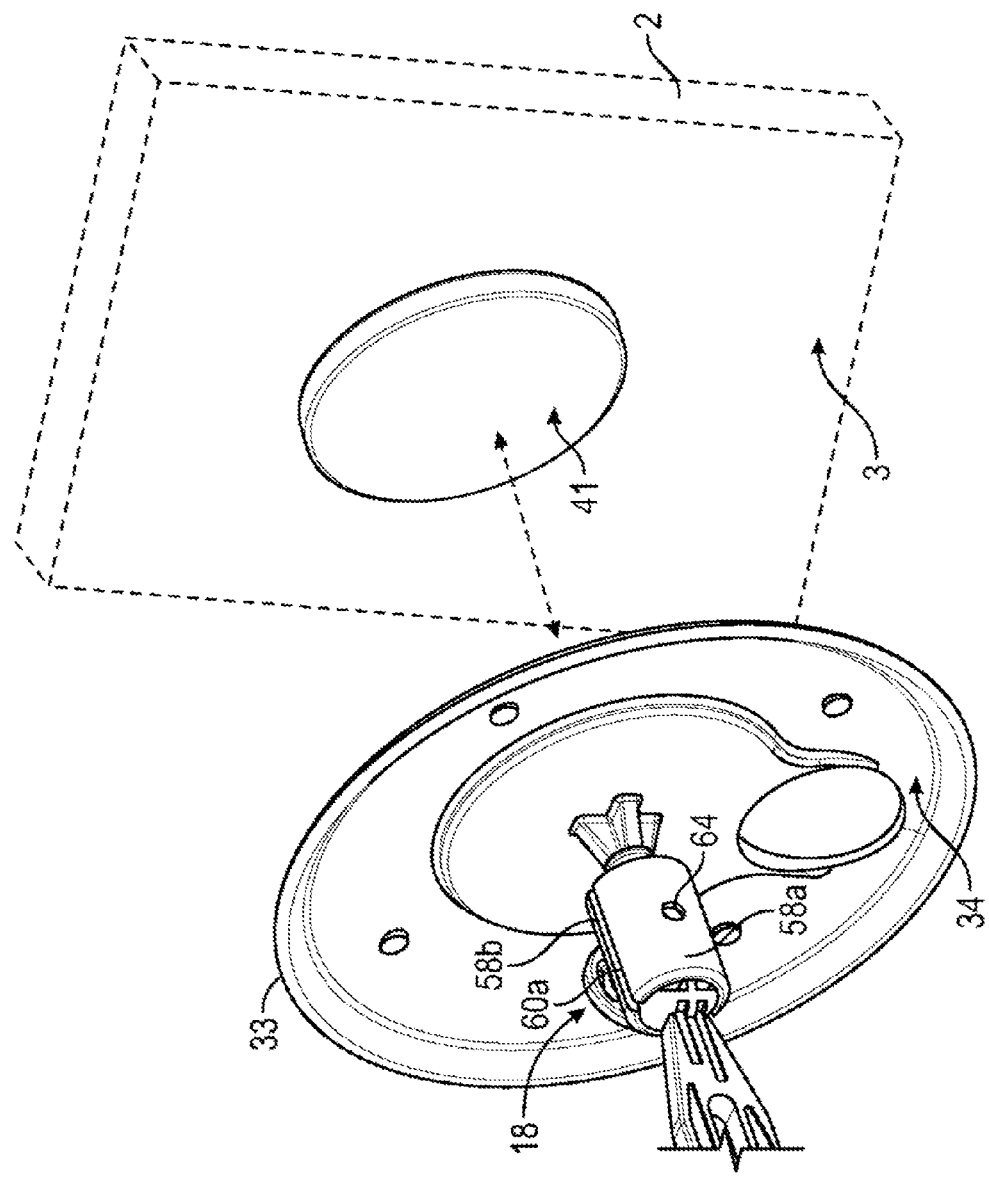

Referring specifically to FIGS. 1-4, the tablet attachment assembly 32 will now be described in detail. The tablet attachment assembly 32 of the present invention allows for quick, one-handed attachment and release of a tablet computer to the tablet arm 10, thereby increasing the user's ability to efficiently use the tablet computer, and maximizing the likelihood that the user will always use the tablet computer in an ergonomically correct position, i.e., attached to the tablet arm 10 and at the user's eye level. In FIGS. 2 and 3, an exemplary tablet computer 2 is shown. The arm assembly 12 and tablet attachment assembly 32 of this embodiment of the tablet arm 10 can accommodate and support a tablet computer 2 weighing up to approximately 5.0 pounds (2.3 kilograms). In alternate embodiments, the tablet arm 10 may be configured to also support masses greater than 5.0 pounds (2.3 kilograms), or be capable of supporting masses of no more than 4.0 pounds (1.8 kilograms). The tablet computer 2 of this embodiment has a front side 9, a rear side 3, a top side 5, a bottom side 6, a left side 7, and a right side 8. In this embodiment, the tablet attachment assembly 32 includes a release plate 33 and a magnet assembly 36. In this embodiment, the release plate 33 is comprised of ABS plastic, though it should be understood that in alternate embodiments the release plate 33 may be made of any other suitable material, for example wood, metal, or other types of plastics.

Figure 15:
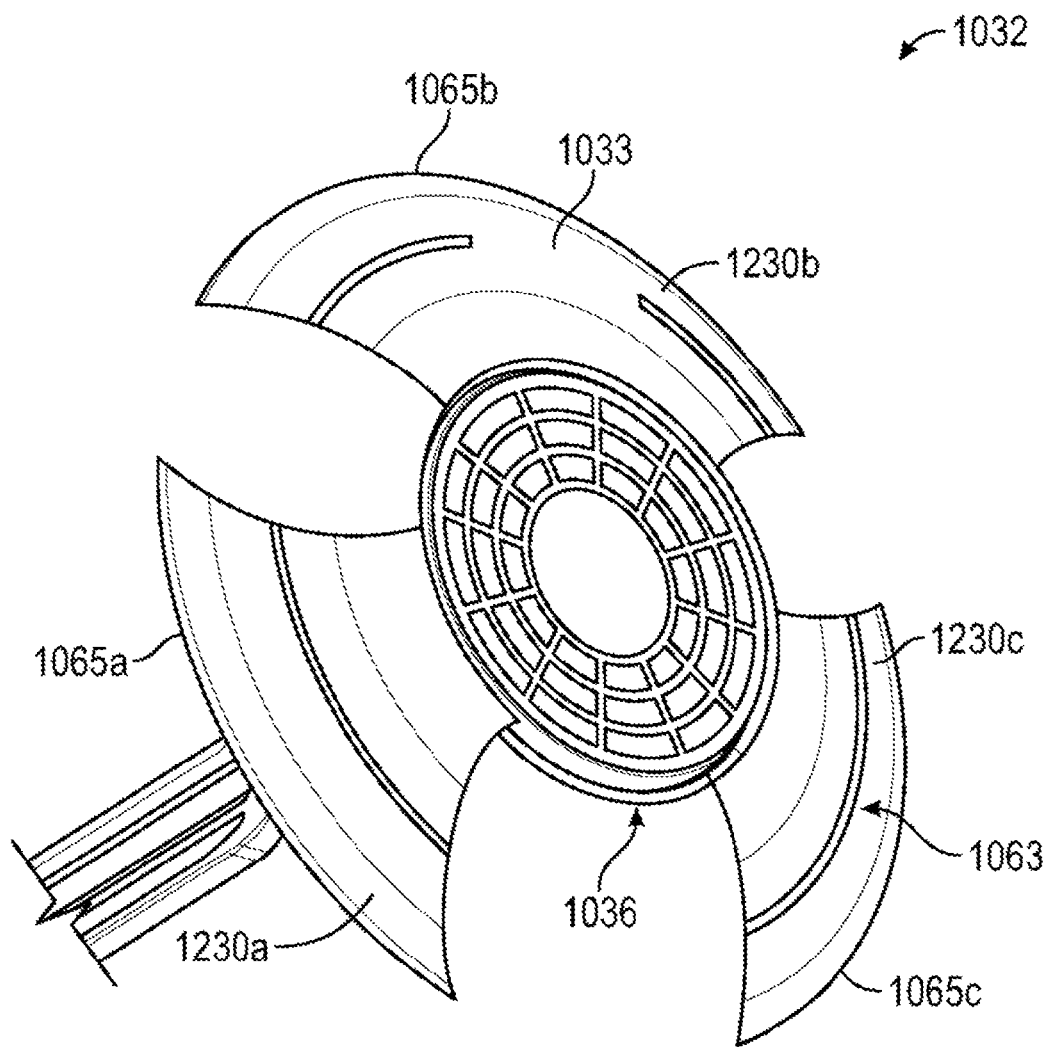
FIG. 15 is a partial view of an alternate embodiment of a tablet attachment assembly according to the present invention.

The front side 63 of the release plate 33 of this embodiment has an outer portion 52 having an outer edge 65 and a center portion 48 that includes a recess 49 that is sized and shaped to accommodate removable placement of the magnet assembly 36 therein. In this embodiment, both the outer portion 52 and the outer edge 65 are continuous around the entire perimeter thereof. In alternate embodiments, the outer portion 52 and/or the outer edge 65 need not be continuous around the entire perimeter thereof; in other words, the outer portion 52 and/or outer edge 65 could include gaps therein or be broken into multiple distinct portions. FIG. 15 shows an alternate embodiment of a tablet attachment assembly 1032 comprising a magnet assembly 1036 that is substantially identical to the magnet assembly 36 of the embodiment of FIG. 1, and a release plate 1033 that comprises three separate release plate portions 1230a-1230c, each having a separate, respective outer edge 1065a-1065c.

Returning back to FIGS. 1-4, within the recess 49 of the release plate 33 is an attachment disc 44 that is comprised of a ferrous metal, for example steel or cast iron. In this embodiment, the attachment disc 44 is approximately circular in shape and has three equally-spaced tabs protruding from the perimeter thereof (only tab 46 is shown and labeled in FIG. 2). Each tab 46 is inserted into one of three complementary slots (only slot 50 is shown and labeled in FIG. 2) located within the recess 49 in order to maintain the position of the attachment disc 44 within the recess 49 and prevent the attachment disc 44 from rotating within the recess 49. The front side 45 of the attachment disc 44 is exposed within the recess 49 when the magnet assembly 36 is not located within the recess 49. In alternate embodiments, the attachment disc 44 need not be circular in shape, and could have different shapes, for example a triangular, square, rectangular, or other polygonal shape, or an irregular shape. In this embodiment, the front side 63 of the outer portion 52 of the release plate 33 is convex (in other words, the front side 63 of the outer portion 52 of the release plate 33 curves outwardly). In alternate embodiments, the front side 63 of the release plate 33 may be at least partially convex or at least partially concave.

The magnet assembly 36 is comprised of a magnet holder 37, a magnet 38 that sits within a recess (not labeled) located in the magnet holder 37, and a gel disc 39 that is attached over the front side of the magnet holder 37 and magnet 38 and thereby forms the front side 40 of the magnet assembly 36. In this embodiment, the gel disc 39 is a double-sided adhesive disc such as those produced by The 3M Company of St. Paul, Minn., United States, and is sized and shaped to cover the entire front side of the magnet holder 37. In alternate embodiments, any adhesive or device sufficient to releasably support the combined mass of the magnet assembly 36 and tablet computer 2 could be used in place of the gel disc 39. Examples include hook-and-loop fasteners, reclosable fasteners, and suction materials.

When the tablet arm 10 is initially packaged and/or shipped, the magnet assembly 36 will preferably, though optionally, be pre-assembled, with the front surface of the gel disc 39 being unaffixed to any object and ready to be applied to the rear side 3 of the tablet computer 2. The magnet assembly 36 may also optionally be shipped while stored within the recess 49. In this case, the user may insert one or more fingers into the hole 51 located in the release plate 33 and pull outwardly on the magnet assembly 36, thereby releasing the magnet assembly 36 from the attachment disc 44 so that the magnet assembly 36 can be attached to an electronic device, for example tablet computer 2, as described below.

Assuming that the magnet assembly 36 comes preassembled, as noted above, in order to attach the magnet assembly 36 to the tablet computer 2, the user will remove the magnet assembly 36 from within the recess 49 (if necessary), remove any protective coating or sheet that is located on the front side of the gel disc 39 (i.e., from the adhesive layer that is located on the exposed side of the gel disc), and then press the front side 40 of the magnet assembly 36 into contact with the rear side 3 of the tablet computer 2, optionally holding it there for a duration of time necessary in order to ensure that the adhesive layer of the gel disc 39 stays attached to the tablet computer 2. In this way, the tablet computer 2 has now been affixed with the magnet assembly 36, which will permit the tablet computer 2 to be easily and repeatedly attached and removed from the tablet arm 10, as desired by the user. Alternatively, if the rear side 3 of the tablet computer 2 includes an attachment structure (not shown), the front side 40 of the magnet assembly 36 could include a complementary structure (not shown) that is designed to be attached to the attachment structure.

Figure 4:
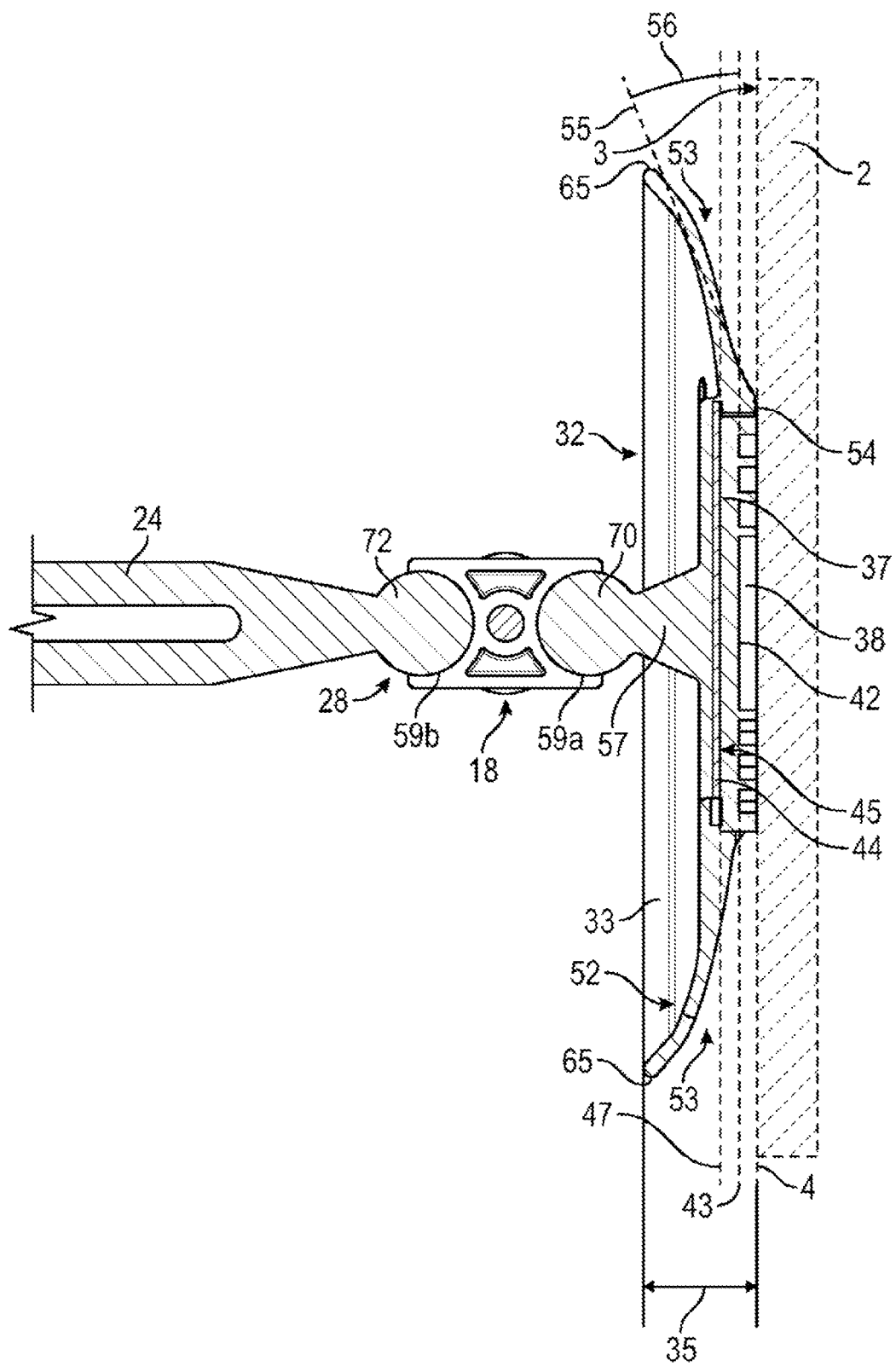
FIG. 4 is a sectional view taken along a vertical axis through the middle of the tablet arm of FIG. 1, showing the connection means to an exemplary tablet computer.

As shown in FIG. 3 and the sectional view of FIG. 4, when the user desires to attach the tablet computer 2 to the tablet arm 10 of this embodiment, they bring the magnet assembly 36 into contact with or in close proximity to the attachment disc 44, whereby the magnetic attraction between the magnet 38 and the attachment disc 44 will act to adhere the rear side 41 of the magnet assembly 36 (i.e., the mounting surface) to the attachment disc 44 (which, as noted above, is comprised of a ferrous metal). In this way, the magnet assembly 36 and attached tablet computer 2 become removably attached to the distal end 28 of the distal arm member 24 of the tablet arm 10. As described below in detail, the user can then reposition and adjust the tablet arm 10 according to their choosing, thereby supporting the tablet computer 2 in whatever location and orientation that is chosen by the user. In this embodiment, the magnet assembly 36 is designed to be affixed to the rear side 3 of the tablet computer 2, and the attachment disc 44 is affixed to the release plate 33. In alternate embodiments, the arrangement of the tablet attachment assembly 32 could be reversed, wherein the ferrous metal attachment disc could be attached to the rear side 3 of the tablet computer 2, and the magnet assembly 36 is affixed to or an integral part of the release plate 33. Moreover, in alternate embodiments the magnet holder 37 could be omitted, in which case the magnet 38 (along with a suitable adhesive) would constitute the entire magnet assembly 36, and in which case the rear side 42 of the magnet 38 would constitute the mounting surface for attachment to the attachment disc 44.

As shown in FIG. 4, when the magnet assembly 36 is attached to the attachment disc 44, a plane 47 corresponding with the front side 45 of the attachment disc 44 is substantially parallel to a plane 43 corresponding with the rear side 42 of the magnet 38. In this embodiment, since the rear side 3 of the exemplary tablet computer 2 is planar, a plane 4 corresponding with the rear side 3 of the tablet computer 2 is also substantially planar with both the plane 47 of the front side 45 of the attachment disc 44 and the plane 43 of the rear side 42 of the magnet 38. Of course, not all tablet computers will have an entirely or substantially planar rear side, hence in some instances perhaps only a portion of the rear side of a tablet computer that is attached to the magnet assembly 36 will be substantially parallel with either the plane 47 of the front side 45 of the attachment disc 44 or the plane 43 of the rear side 42 of the magnet 38.

In this embodiment, a lip 54 of the outer portion 52 of the release plate 33, and indeed the entire outer portion 52 of the release plate 33, angles away from the plane 4 of the rear side 3 of the tablet computer 2 and the plane 43 of the rear side 42 of the magnet 38 of the magnet assembly 36 around the entire perimeter of the release plate 33. Thus, a gap 53 is present between the rear side 3 of the tablet computer 2 and the outer portion 52 of the release plate 33 around the entire perimeter of the outer portion 52. A line 55 that is tangent to both the lip 54 and the outer edge 65 of the outer portion 52 of the release plate 33 can thus be drawn at nearly any point around the perimeter of the release plate 33. Preferably, the angle 56 measured between the line 55 and the plane 43 of the rear side 42 of the magnet 38 is between 10-45 degrees; more preferably it is between 15-35 degrees; and most preferably it is between 20-30 degrees. Applicant discovered that this angle 56 must be great enough such that there is sufficient space between the rear side 3 of the tablet computer 2 and the front side of the release plate 33 such that the tablet computer 2 may be moved into the gap 53 a sufficient distance in order to free the magnet assembly 36 from the attachment disc 44, but small enough such that the user can grab both around a side (e.g., one of top side 5, bottom side 6, left side 7, and right side 8) of the tablet computer 2 and the outer portion 52 of the release plate 33 with one hand.

The maximum depth of the gap 53 (i.e., the greatest distance between the outer portion 52 of the release plate 33 and the plane 4 of the rear side 3 of the tablet computer 2, measured along an axis that is perpendicular to the rear side 41 of the magnet assembly 36) is preferably between 0.50 inches (1.27 cm) and 1.50 inches (3.81 cm), more preferably between 0.75 inches (1.91 cm) and 1.25 inches (3.18 cm), and most preferably between 0.75 (1.91 cm) and 1.00 inches (2.54 cm), although other depths are possible within the scope of this invention. In most embodiments, including the embodiment shown in FIG. 4, the maximum depth of this gap 53 corresponds with the thickness 35 of the release plate 33. The gap 53 allows for the user to, with just one-hand, grab around either the top side 5, bottom side 6, left side 7, or right side 8 of the tablet computer 2 and around the outer edge 65 of the outer portion 52 of the release plate 33 and either push or pull the rear side 3 of the tablet computer 2 into the gap 53 and towards the outer portion 52 of the release plate 33 such that the magnetic force between the magnet 38 and the attachment disc 44 is reduced to a point where the magnet assembly 36 (and the attached tablet computer 2) is released from the attachment disc 44. Since the user's hand is already located around an edge of the tablet computer 2, the user can remove their fingers from the release plate 33 while maintaining a grip on the tablet computer 2, and remove the tablet computer 2 from the tablet arm 10.

Figure 5:
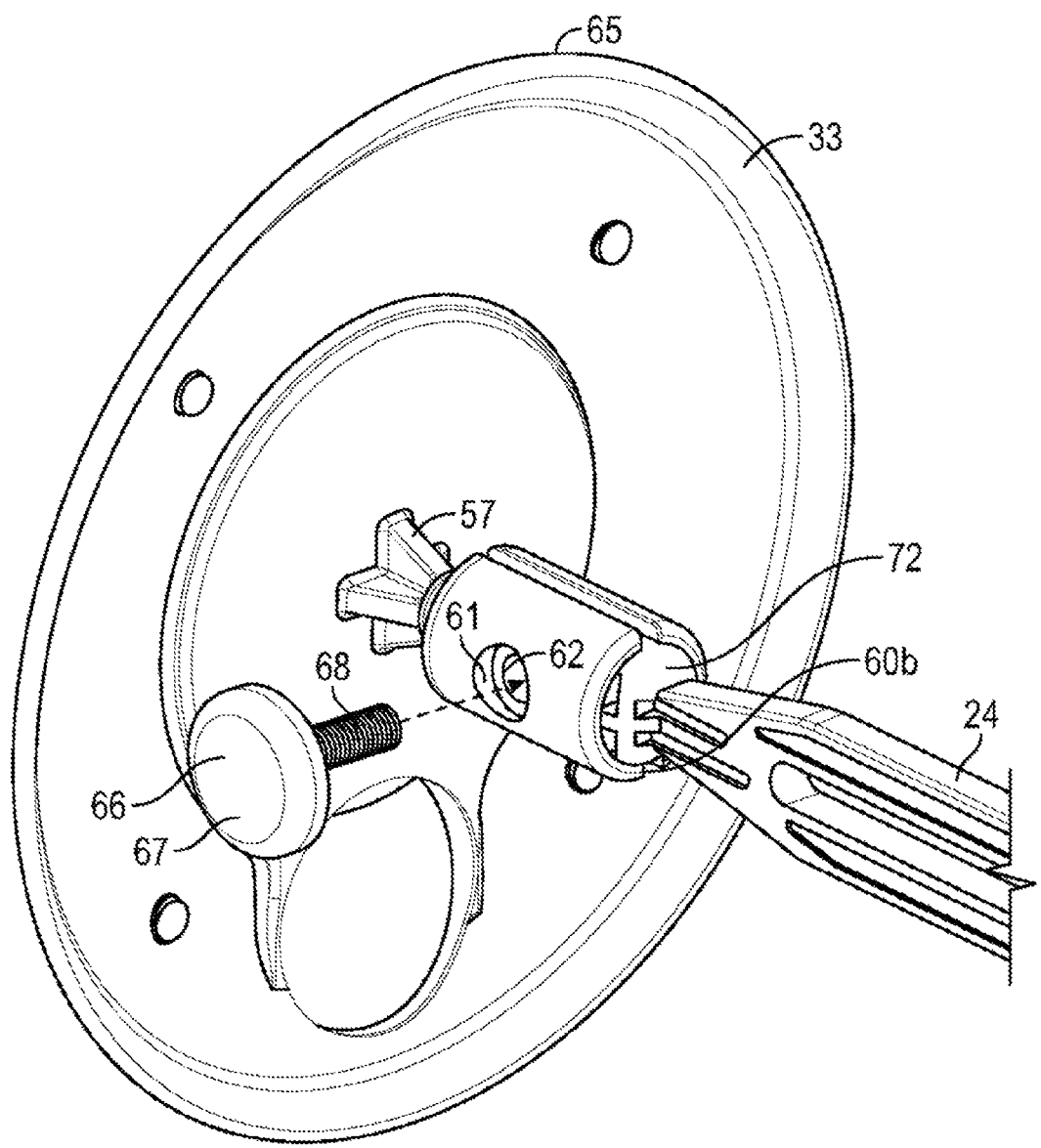
FIG. 5 is a close-up view of the rear side of the release plate and distal joint of the tablet arm of FIG. 1.

Referring now to FIGS. 3-5, a detailed description of the distal joint 18 of the tablet arm 10, which in this embodiment is a double ball-and-socket joint, will be provided. In this embodiment, extending from a rear side 34 of the release plate 33 is a stem 57 that tapers in width and includes a ball 70 at the end thereof. The distal end 28 of the distal arm member 24 includes a ball 72 that is substantially identical to the ball 70 of the release plate 33. The distal joint 18, in this embodiment, is comprised of two half-cylinder pieces 58a,58b. The two half-cylinder pieces 58a,58b are fitted together around the two balls 70,72 such that cumulatively they form an approximately hemi-spherical socket at each end thereof: a first socket 59a that accommodates the ball 70 therein and a second socket 59b that accommodates the ball 72 therein. One of the half-cylinder pieces 58b includes a recessed portion 61 and a hole 62 that passes therethrough that aligns with a threaded hole 64 located in the other half-cylinder piece 58a. In this embodiment the hole 62 is non-threaded, but in alternate embodiments the hole 62 may include internal threading. A tightening screw 66 having a head 67 and a threaded portion 68 is routed through the hole 62 in the first half-cylinder piece 58b and the threading of the threaded portion 68 is mated with the internal threading of the threaded hole 64. The tightening screw 66 thus holds the two half-cylinder pieces 58a,58b in place around the balls 70,72, thereby creating the double ball-and-socket distal joint 18. A pair of lengthwise gaps 60a,60b remain between the two half-cylinder pieces 58a,58b when installed around the balls 70,72. Tightening of the tightening screw 66 pulls the two half-cylinder pieces closer 58a,58b together, thereby decreasing both the distance between the two half-cylinder pieces 58a,58b and the widths of the gaps 60a,60b, and increasing the amount of friction that is applied by the half-cylinder pieces 58a,58b to the balls 70,72. The balls 70,72 may be repositioned within the sockets 59a,59b as desired by the user in order to change the angle at which the distal joint 18 extends from the distal end 28 of the distal arm member 24 and/or the angle at which the tablet attachment assembly 32 extends from the distal joint 18.

Figure 6:
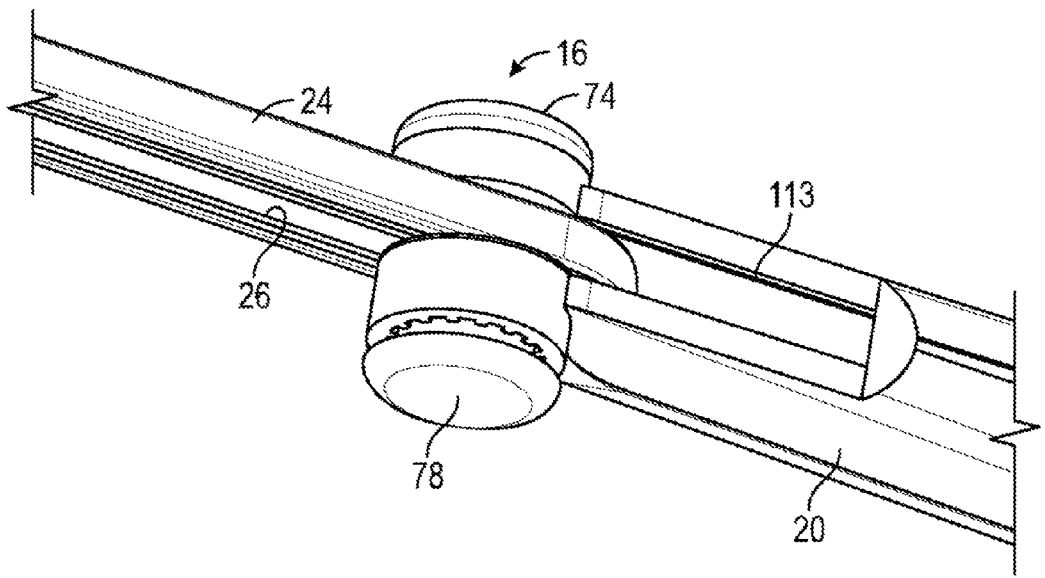
FIG. 6 is a close-up view of the medial joint thereof.
Figure 7:
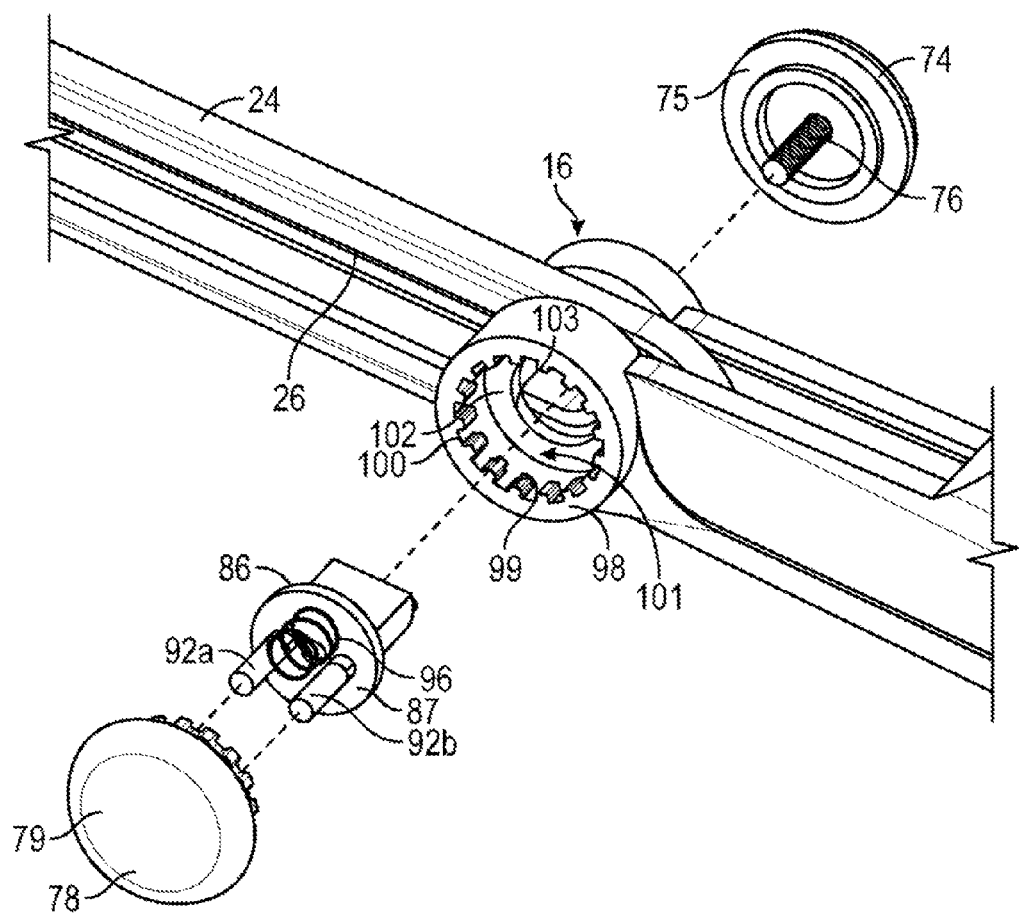
FIGS. 7 and 8 are partial exploded views thereof.
Figure 8:
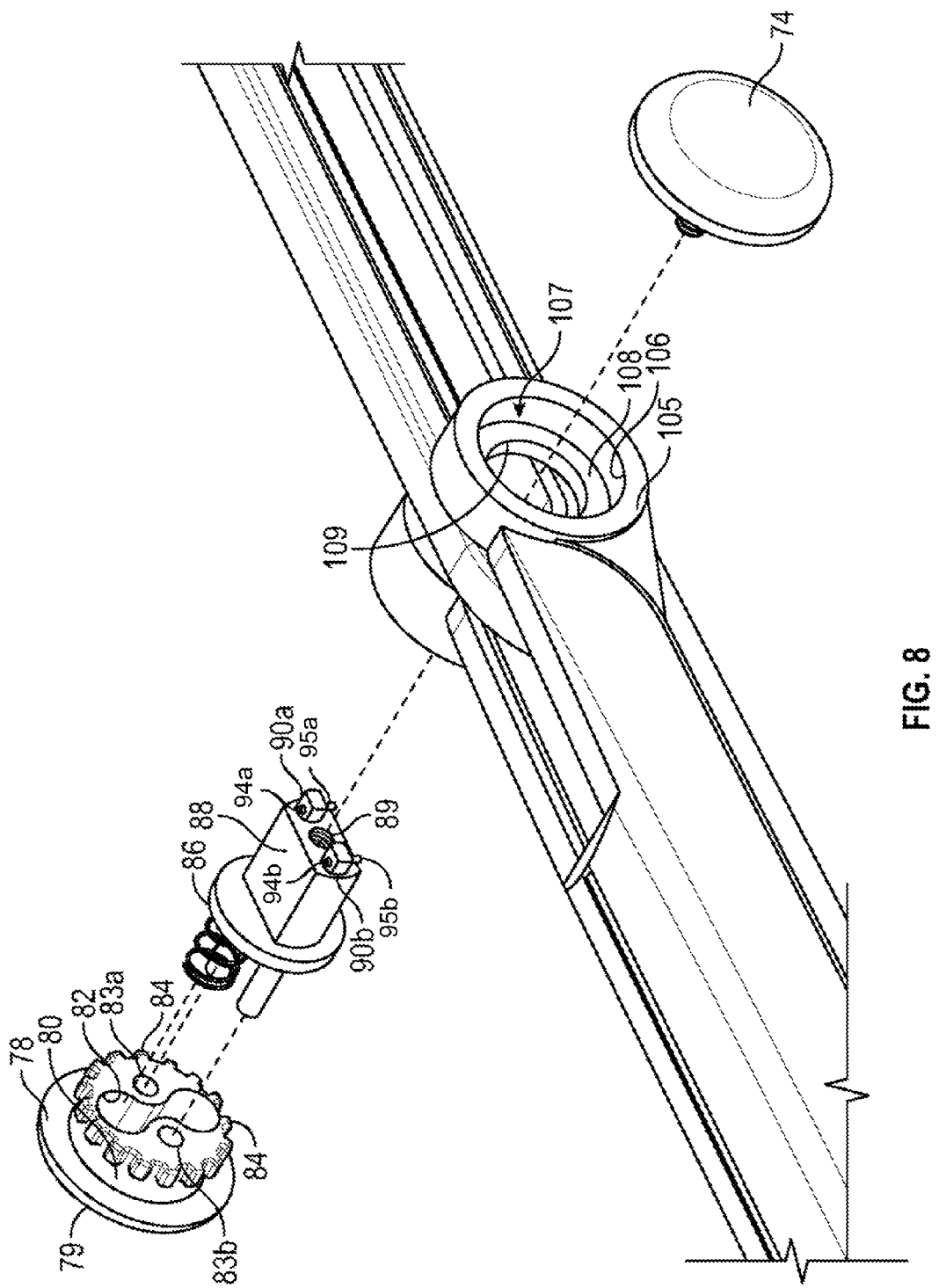

Referring now to FIGS. 6-8, a detailed description of the medial joint 16 of the proximal arm member 20 of the tablet arm 10 will be provided. The medial joint 16 is located at the distal end 22 of the proximal arm member 20, and provides the connection means between the proximal arm member 20 and the distal arm member 24. As will be described in greater detail below, the slot 26 located along the longitudinal axis 31 of the body 25 of the distal arm member 24 is adjustable relative to the medial joint 16 such that the distal arm member 24 is both length- and angularly-adjustable relative to the proximal arm member 20. As seen in FIGS. 7 and 8, the distal end 22 of the proximal arm member 20 has a first coupling 98 located on one lateral side of the medial joint 16 and a second coupling 105 located on an opposing lateral side of the medial joint 16. Both couplings 98, 105 have an outer opening (100,106, respectively), a wall (102,108, respectively) that surrounds an inner opening (103,109, respectively), and an interior space (101,107, respectively) located between the respective inner and outer opening. The medial joint 16 is primarily comprised of a push button 78 located on one lateral side of the distal end 22 of the proximal arm member 20 (corresponding with coupling 98), a joint cover 74 located on the opposing lateral side of the distal end 22 of the proximal arm member 20 (corresponding with coupling 105), a compression spring 96, and a joint key 86, both of which are located between the push button 78 and the joint cover 74. The push button 78 has a cap portion 79 and a body portion 80 that extends interiorly from the cap portion 79. The interior end of the body portion 80 of the push button 78 includes a spring hole 82 and a pair of post holes 83a,83b located therein. The interior end of the body portion 80 also has a plurality of teeth 84 located around the perimeter thereof. The plurality of teeth 84 are complementary in size and shape with a plurality of complementary notches 99 that surround the perimeter of the outer opening 100 of the coupling 98. As discussed in further detail below, rotation of the distal arm member 24 about the medial joint 16 is prevented when the plurality of teeth 84 and plurality of complementary notches 99 are engaged together and permitted when the plurality of teeth 84 and plurality of complementary notches 99 are disengaged.

The joint key 86 has a disc portion 87 and a slot-engaging portion 88. The joint key 86 has a pair of post holes 90a,90b located therethrough, into a respective one of which a push button post 92a,92b is routed. When the joint key 86 is inserted through the coupling 98 and the slot-engaging portion 88 of the joint key 86 is fitted through the slot 26 in the distal arm member 24, the push button posts 92a,92b are held in place by perpendicularly-oriented pins 95a,95b that are inserted into pin holes 94a,94b located at ends of the push button posts 92a,92b. These pins 95a,95b prevent the push button posts 92a,92b from moving in a direction generally towards the push button 78. The opposite ends of the push button posts 92a,92b are fitted into the post holes 83a,83b located in the body portion 80 of the push button 78. One end of the compression spring 96 fits into the spring hole 82 located in the body portion 80 of the push button 78, and the other end of the compression spring 96 rests against the disc portion 87 of the joint key 86. The joint cover 74 has a body portion 75 and a threaded portion 76 that engages with a threaded hole 89 located in the slot-engaging portion 88 of the joint key 86 to hold the medial joint 16 together. If the user desires to add friction to the medial joint 16, the joint cover 74 can be rotated clockwise in order to tighten the body portion 75 of the joint cover 74 against the coupling 105. The amount of friction on the medial joint 16 can likewise be reduced by rotating the joint cover 74 in a counter-clockwise direction.

When the medial joint 16 is assembled, as shown in FIG. 6, the slot-engaging portion 88 of the joint key 86 is located within the slot 26 in the distal arm member 24. Additionally, the compression spring 96 biases the push button 78 into a position in which the plurality of teeth 84 are engaged with the plurality of complementary notches 99, thereby preventing rotation of the distal arm member 24 about the medial joint 16. When the push button 78 is depressed in a direction substantially along the axis 122 that runs through the center of the medial joint (see FIG. 9) towards the joint cover 74, the compression spring 96 is compressed and the plurality of teeth 84 are freed from the plurality of complementary notches 99 and move within the interior space 101 of the coupling, thereby permitting the distal arm member 24 to be rotated about the medial joint 16 (i.e., about axis 122). Once the push button 78 is released, the compression spring 96 becomes undepressed, the push button 78 moves outwardly, and the plurality of teeth 84 become reengaged with the plurality of complementary notches 99, thereby preventing rotation of the distal arm member 24 about the medial joint 16. The push button 78 does not need to be depressed in order to allow for adjustment of the effective length 224 of the distal arm member 24 (i.e., in order for the slot-engaging portion 88 to be slidable within the slot 26).

Figure 9:
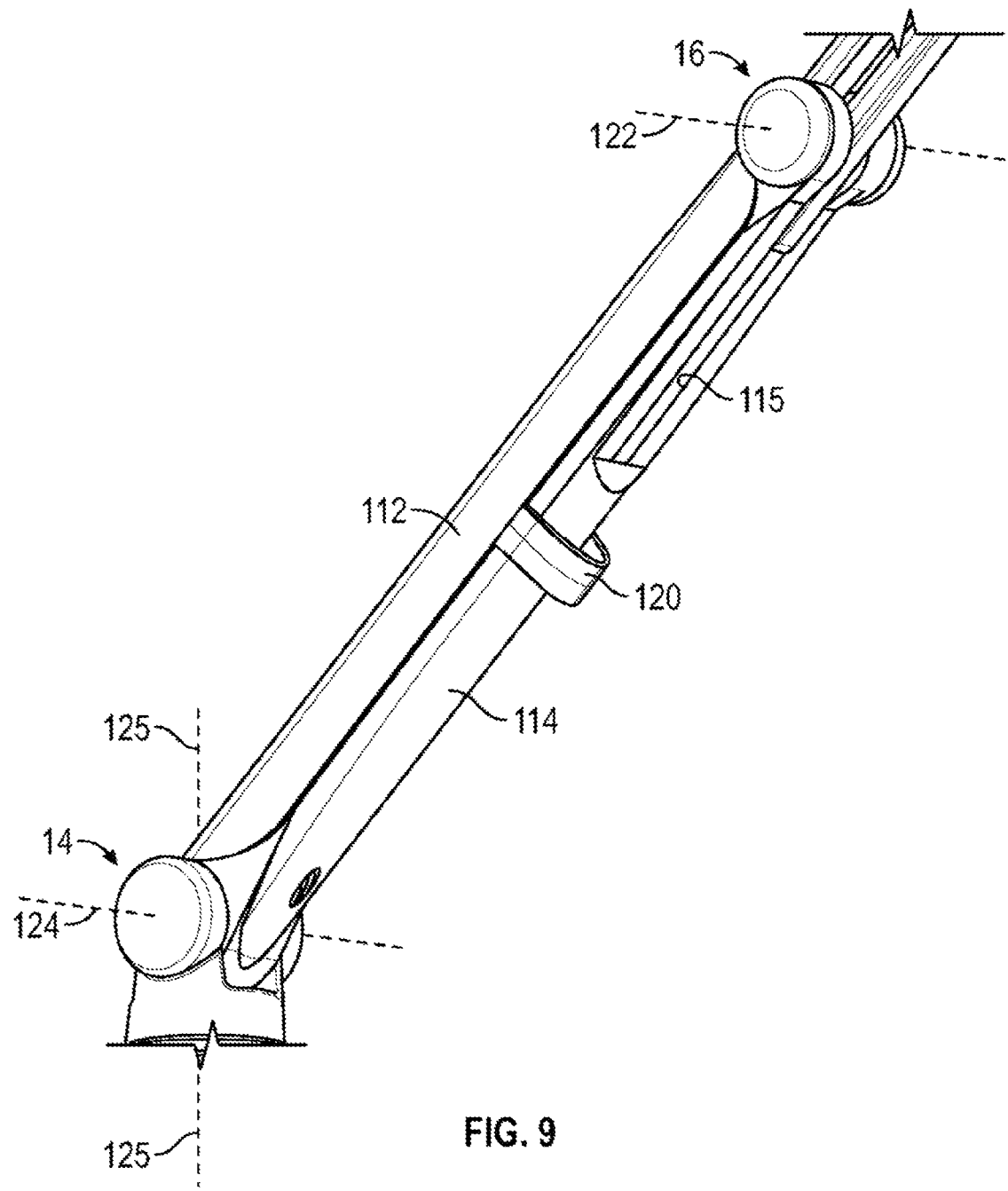
FIG. 9 is a close-up view of the proximal arm member of the tablet arm of FIG. 1.

As shown in FIG. 9, the proximal arm member 20 is comprised of an upper channel 112, a lower channel 114, the medial joint 16, and the proximal joint 14. The medial joint 16 is joined to the lower channel 114 via couplings 98, 105, as discussed above, and the proximal joint 14 is joined to the lower channel 114 via coupling 130, as discussed below in further detail. In this embodiment, the upper channel 112 serves primarily as a cover that connects to the lower channel 114 and helps to form the concealed portion 226 of the stowage slot 30 that is located in the proximal arm member 20 between the upper channel 112 and lower channel 114 (see FIG. 1A). The stowage slot 30 is sized and shaped to accommodate the placement of the entire portion of the body 25 of the distal arm member 24 that includes the slot 26 therein. The upper channel 112 includes a gap 113 (see FIG. 6) and the lower channel 114 includes a gap 115. The gaps 113,115 allow space for the proximal end 27 of the distal arm member 24 (see FIG. 14)—and therefore the entire distal arm member 24—to rotate about the medial joint 16 when the distal arm member 24 has been adequately extended out of the stowage slot 30 (i.e., such that the proximal end 27 of the distal arm member 24 can move within one or both of the gaps 113,115). In this embodiment, the gap 115 in the lower channel 114 is longer than the gap 113 in the upper channel 112 in order to permit the arm assembly 12 to be folded back on itself (such that, if the tablet arm 10 is attached to a horizontal surface, the lower channel 114 faces upwardly and the distal arm member 24 is located above the lower channel 114). In alternate embodiments, the gaps 113,115 may be the same length, or the gap 113 in the upper channel 112 may be longer than the gap 115 in the lower channel 114.

Referring back to FIG. 9, in this embodiment the lower channel 114 has a cable-routing clip 120 attached thereto. Device cable(s) from the tablet computer 2 may be routed through the cable-routing clip 120 in order to organize the cables and keep them from becoming caught or damaged on any part of the tablet arm 10. In alternate embodiments, the cable-routing clip 120 may be omitted entirely. In alternate embodiments, an additional cable-routing clip may be attached to the distal joint 18 so that device cables can be managed in proximity to the tablet attachment assembly 32.

Figure 10:
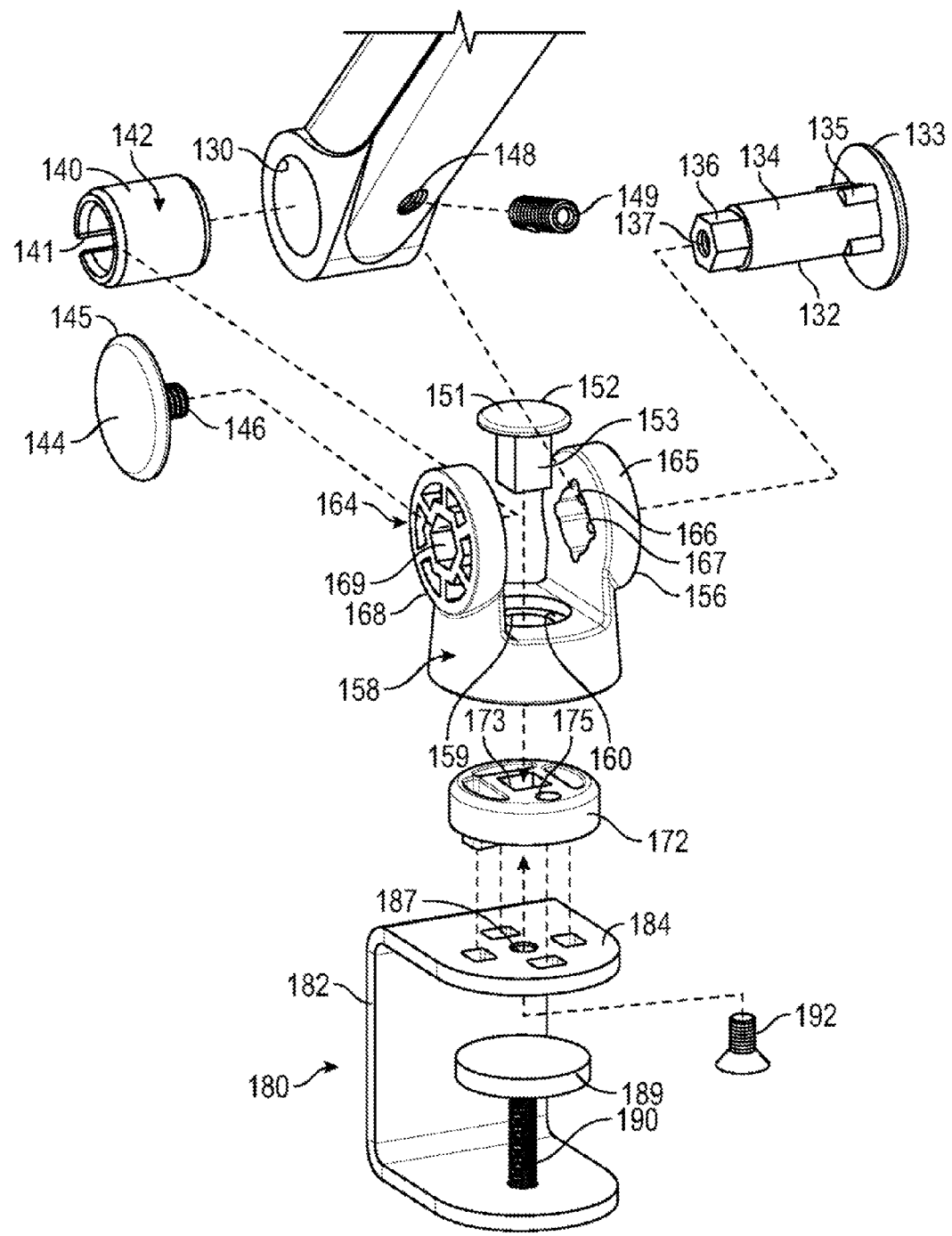
FIGS. 10 and 11 are partial exploded views of the base mount and proximal joint thereof.
Figure 11:
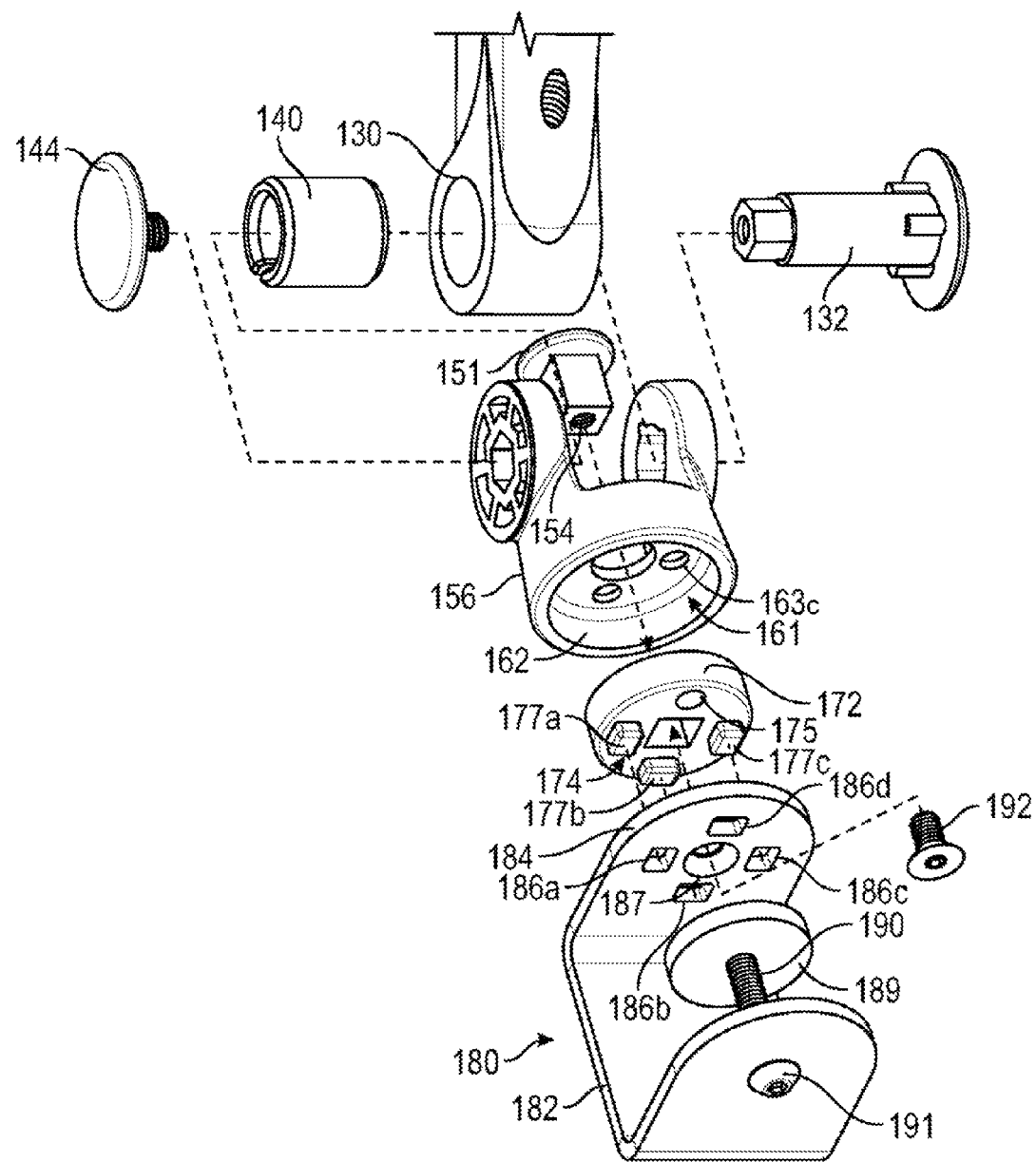
Figure 12:
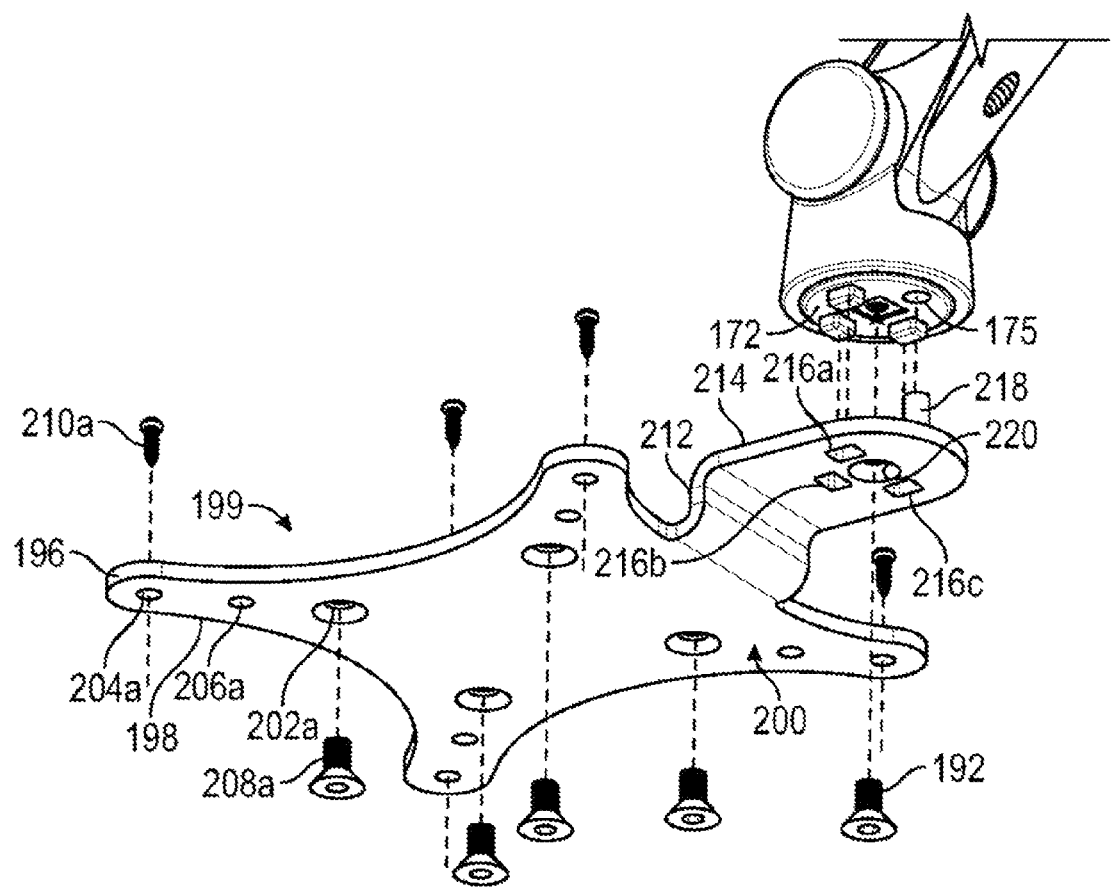
FIG. 12 is a close-up view of an alternate base mount for direct connection of the tablet arm to the rear side of a monitor having a VESA bolt-pattern.

FIGS. 10 and 11 are partial exploded views showing the construction of the proximal joint 14 and the base mount 180. An alternate base mount is shown in FIG. 12, and will be discussed in further detail below. In this embodiment, the proximal joint 14 is comprised of a base tower 156 having a base portion 158 and an upper portion 164. The upper portion 164 has a first side portion 168 and a second side portion 165. In this embodiment, the first side portion 168 has a hole 166 that is in the shape of a hexagonal prism. In this embodiment, the second side portion 165 has a hole 166 that has a "flower" shape in two-dimensions (essentially, the hole 166 is in the shape of a cylinder with a plurality of semi-cylindrical cutouts (only cutout 167 is labeled in the Figures) arranged equidistantly around the perimeter of the cylinder-shaped hole). The proximal end 21 of the proximal arm member 20 has a single coupling 130. The proximal arm member 20 is attached to the base tower 156 by aligning the coupling 130 with the holes 169,166 in the base portion 158, and then inserting a proximal joint shaft 132 through the hole 166, the coupling 130 and a bushing 140 (see below), and then the hole 169.

The proximal joint shaft 132 has a cap portion 133 at one end, a shaft portion 134 that is cylindrical in shape, and a hexagonal prism-shaped ("hex") portion 136 at the opposing end thereof. A plurality of rotation stops (only rotation stop 135 is labeled in the Figures), which in this embodiment are semi-cylindrical in shape and complement the shape of the semi-cylindrical cutouts 167, are located at the end of the shaft portion 134 of the proximal joint shaft 132 adjacent to the cap portion 133. The rotation stops 135 fit snugly within the semi-cylindrical cutouts 167 and prevent rotation of the proximal joint shaft 132 about an axis 124 that runs through the center of the proximal joint 14 corresponding with the axis of the coupling 130 (see FIG. 9). The hex portion 136 of the proximal joint shaft 132 is sized and shaped to fit snugly within the hole 169, in order to prevent rotation of the proximal joint shaft 132 about the axis 124. Located at the end of the hex portion 136 is an internally-threaded hole 137.

When the proximal joint shaft 132 is installed in the coupling 130, a bushing 140 surrounds the shaft portion 134 thereof. In this embodiment, the bushing 140 is a split bushing having a gap 141 and an exterior surface 142. A shaft cover 144 having a cap portion 145 and a threaded portion 146 that engages with the internally-threaded hole 137 located in the proximal joint shaft 132 is placed over the coupling 130 and attached to the proximal joint shaft 132 in order to complete assembly of the proximal joint 14. In this embodiment, the bushing 140 is made of bronze. In alternate embodiments, other suitable materials may be used instead of bronze to form the bushing 140, including other metals and nylon.

The amount of friction that is supplied to the proximal joint shaft 132 can be adjusted in two ways. First, the shaft cover 144 can be rotated in a clockwise direction to apply increased pressure to the proximal joint shaft 132 and the coupling 130, thereby increasing the friction on the proximal joint 14, or rotated in a counter-clockwise direction to apply reduced pressure to the proximal joint shaft 132 and the coupling 130, thereby decreasing the friction on the proximal joint 14. Second, a threaded hole 148 in the lower channel 114 allows a set screw 149 to pass therethrough and engage the exterior surface 142 of the bushing 140. In this embodiment the set screw 149 has an adjustment end with a female hex shaped opening for engagement with an Allen wrench, although alternate adjustment end styles for the set screw 149 are possible within the scope of this invention. Rotation of the set screw 149 in a clockwise direction will apply added pressure to the exterior surface 142 of the bushing 140, thereby decreasing the size of the gap 141 and applying added pressure to the proximal joint shaft 132. Rotation of the set screw 149 in a counter-clockwise direction will reduce the amount of pressure that is applied by the set screw 149 to the exterior surface 142 of the bushing 140, thereby increasing the size of the gap 141 and reducing the amount of pressure that is applied to the proximal joint shaft 132. When the bushing 140 is installed in the coupling 130, the gap 141 in the bushing 140 should be rotated away from where the set screw 149 will enter the coupling 130, so that the set screw 149 will not engage the gap 141 but will instead engage the exterior surface 142 of the bushing 140.

The connection between the base tower 156 and the base mount 180 will now be described in detail. In this embodiment, the base portion 158 of the base tower 156 has an opening 159 therein into which a friction member 151 is inserted. The opening 159 has a circular cross-sectional shape. Surrounding the opening 159 on the bottom side 161 of the base tower 156 are a plurality of post holes 163 (four equally-spaced post holes are present around the opening 159, but only two of these post holes are shown in FIG. 11 and for convenience only one of these post holes, specifically post hole 163*c*, is labeled in FIG. 11), the purpose of which will be described below with respect to FIG. 12. The friction member 151 has a head portion 152 and a shaft portion 153. When the friction member 151 is inserted into the opening 159, the head portion 152 of the friction member 151 rests against a seat 160 within the opening 159 that prevents the friction member 151 from extending all the way through the opening 159.

A mount adapter 172 is inserted into a space 162 located in the bottom side 161 of the base tower 156. The mount adapter 172 has a friction member opening 173 through the center thereof and a post hole 175 routed therethrough. The shaft portion 153 of the friction member 151 is inserted into the friction member opening 173 of the mount adapter 172. The shaft portion 153 of the friction member 151 has a square cross-sectional shape and size that corresponds with the square cross-sectional shape and size of the friction member opening 173 in the mount adapter 172. The non-circular cross-sectional shapes of the shaft portion 153 and friction member opening 173 ensure that the friction member 151 does not rotate within the friction member opening 173. In alternate embodiments according to this invention, other non-circular cross-sectional shapes for the shaft portion 153 and friction member opening 173 are possible, for example any known polygonal shape including but not limited to triangular, hexagonal, and octagonal.

In the embodiment shown in FIGS. 10 and 11, the base mount 180 comprises a "C"-shaped clamp 182 (when viewed from the side, the shape of the C-clamp 182 approximates three sides of a rectangle) that permits attachment of the base mount 180 to surfaces of varying thicknesses, for example desk or table edges, via adjustment of a threaded bolt 190 having a clamp disc 189 located at the end thereof. Rotation of a head 191 of the threaded bolt 190 raises or lowers the clamp disc 189, as necessary, based on the thickness of the attachment surface. The upper flange 184 of the C-clamp 182 has a bolt hole 187 and stud holes 186*a*-186*d* located therethrough that correspond with the size and shape of studs 177*a*-177*c* that are located on the bottom side 174 of the mount adapter 172. The mount adapter 172, which is inserted within the space 162 in the bottom side 161 of the base tower 156, is attached to the C-clamp 182 of this embodiment by seating the studs 177*a*-177*c* within a corresponding amount of the stud holes 186*a*-186*d* located in the upper flange 184 of the C-clamp 182, and then routing a bolt 192 upwardly through the bolt hole 187 and into a threaded hole 154 that is located in the shaft portion 153 of the friction member 151. Seating of each of the studs 177*a*-177*c* within a corresponding one of the stud holes 186*a*-186*d* prevents rotation of the mount adapter 172 with respect to the base mount 180. When the proximal joint 14 is fully assembled, the circular shape of the opening 159 in the base tower 156 permits rotation of the base tower 156 about an axis 125 (see FIG. 9) vis-à-vis the remaining parts of the proximal joint 14 (e.g., the mount adapter 172 and friction member 151) and the base mount 180. This permits the user to adjust the rotational position of the tablet arm 10 about the vertical axis 125, as desired.

In some applications, rather than attach the tablet arm 10 to a substantially horizontal surface via a C-clamp 182, it may be desirable to attach the tablet arm 10 directly to the rear side of a support means for a primary display screen (not shown), such that the tablet arm 10 holds the tablet computer in a position alongside the primary display screen. FIG. 12 shows an alternate base mount that comprises a VESA mounting plate 196 having a plate portion 198 and a setoff portion 214 that is separated from the plate portion 198 by a bend 212. The plate portion 198 attaches directly to a tilter or other support means that are located adjacent to the mounting means side 199 of the plate portion 198 via bolts 208 (four bolts shown, but for convenience only one bolt 208*a* labeled in FIG. 12) that are routed through a first set of mounting holes 202 (four mounting holes shown, but for convenience only mounting hole 202*a* labeled in FIG. 12) in the plate portion 198 and attached to the support means. In this embodiment, the plate portion 198 also includes two sets of display screen mounting holes 204,206 (four holes for each of the two sets of display screen mounting holes are shown, but for convenience only mounting holes 204*a* and 206*a* labeled in FIG. 12) that are arranged according to existing industry standards for video displays, for example the Video Electronics Standards Association (VESA). The two sets of display screen mounting holes 204,206 may be arranged, for example in 75 mm×75 mm and 100 mm×100 mm square hole patterns according to VESA MIS-D, 75 or VESA MIS-D, 100 standards, respectively. It should be understood that in alternate embodiments, the display screen mounting holes 204,206 may be arranged in a non-standard pattern, only one set of display screen mounting holes can be included in the plate portion 198, or more than two sets of display screen mounting holes can be included in the plate portion 198. The primary display screen is attached to the plate portion 198 by locating the primary display screen adjacent to the display attachment side 200 of the plate portion 198, routing screws 210 (four screws shown, but for convenience only one screw 210*a* labeled in FIG. 12) through either of the sets of display screen mounting holes 204,206, and securing the screws 210 to the primary display screen.

The setoff portion 214 of the VESA mounting plate 196 is spaced from the plate portion 198 by the bend 212 and includes means for attachment to the proximal joint 14 of the tablet arm 10. The setoff space provided by the bend 212 allows for attachment and adjustment of the tablet arm 10 to the setoff portion 214 without interfering with the primary display screen. In this embodiment, the setoff portion 214 includes stud holes 216*a*-216*c* routed therethrough that correspond in size and shape with the studs 177*a*-177*c* that are located on the bottom side 174 of the mount adapter 172, a post 218 that protrudes from the setoff portion 214, and a bolt hole 220 routed therethrough. To attach the mount adapter 172 to the setoff portion 214, the studs 177*a*-177*c* are each seated within a respective one of the stud holes 216*a*-216*c* and the post 218 is placed within the post hole 175 located in the mount adapter 172, and the bolt 192 is passed through the bolt hole 220 located in the setoff portion 214 and secured to the threaded hole 154 in the friction member 151. In this embodiment, the post 218 also extends into one of the post holes 163 located around the opening 159 in the base tower 156. In this embodiment, the post holes 163 extend into but not through the bottom side 161 of the base tower 156. The interaction of the post 218 and the post hole 163*c* prevents the tablet arm 10 from being rotatable about the axis 125 of the proximal joint 14. Because the proximal joint 14 will be oriented vertically in this embodiment (substantially parallel with the plane 4 of the rear side 3 of the tablet computer 2), the weight of the tablet arm 10 and attached tablet computer 2 would tend to rotate the tablet arm 10 about the axis 125 of the proximal joint 14 under the force of gravity if not for the interaction of the post 218 with the post holes 175, 163. Thus, in installing the VESA mounting plate 196, the user would determine on which side of the primary display screen they would like to arrange the tablet computer 2, and would install the VESA mounting plate 196 such that the setoff portion 214 extends in that direction. In the embodiment shown in FIGS. 10 and 11, since the axis 125 of the proximal joint 14 will be oriented horizontally (when attached to a desk or table surface, for example), there is generally no need to prevent rotation about the axis 125 of the proximal joint 14 because the force of gravity will not act to rotate the tablet arm 10 about the axis 125 of the proximal joint 14. In alternate embodiments with respect to the embodiment shown in FIGS. 10 and 11, where it is desirable to limit rotation of the tablet arm 10 about the axis 125 of the proximal joint 14, a post could be supplied on the base mount 180 such that rotation of the base tower 156 about the axis 125 is prevented.

Figure 13:
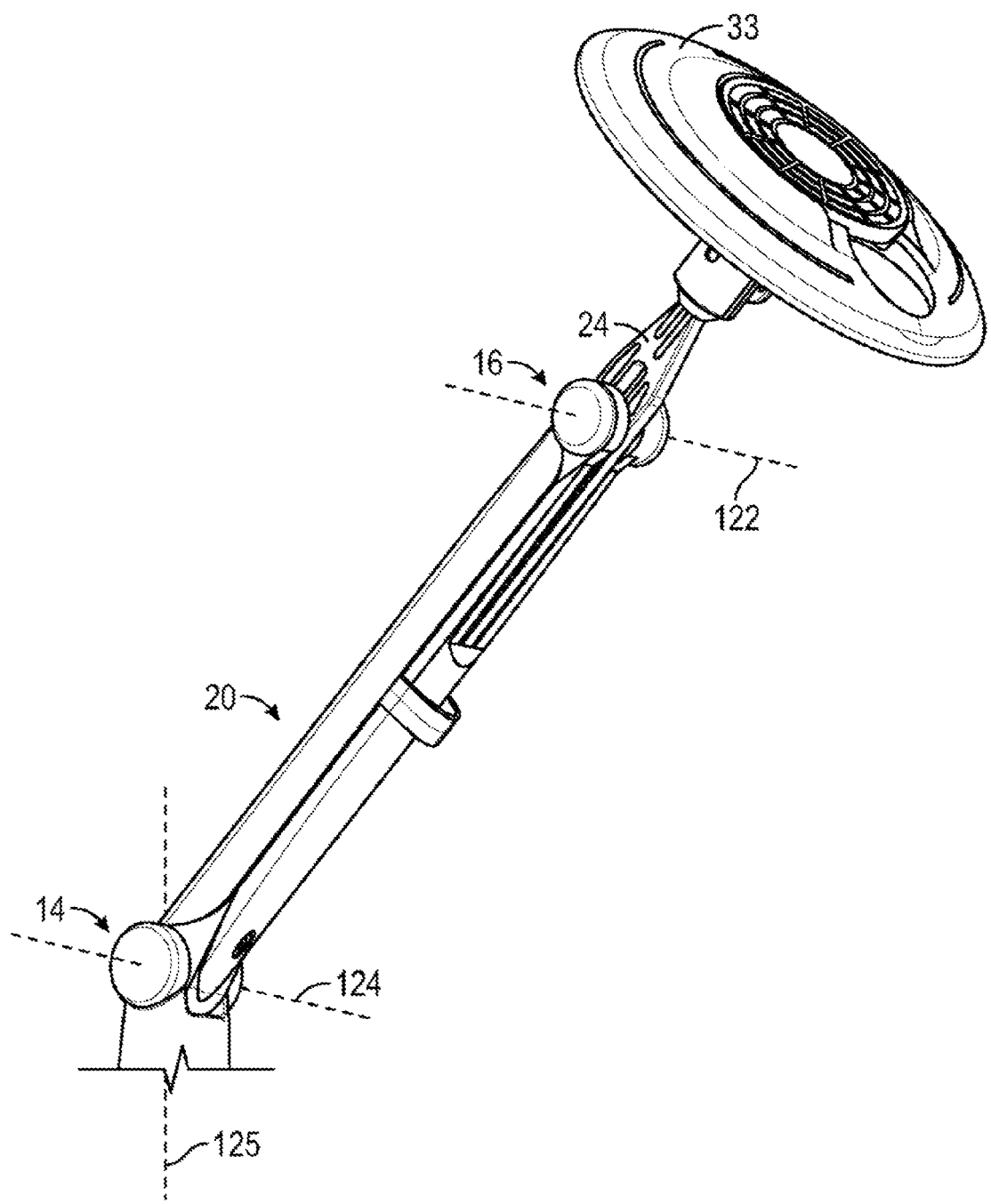
FIG. 13 is a partial view of the tablet arm of FIG. 1, showing the tablet arm in a configuration in which the distal arm member is almost entirely telescopically located within the proximal arm member thereof.

With reference to FIGS. 1, 9, 13, and 14, the configurability of the tablet arm 10 will now be described in detail. FIG. 13 shows the tablet arm 10 in a configuration in which the distal arm member 24 is almost fully refracted within the stowage slot 30 located in the proximal arm member 20, and FIG. 1 shows the tablet arm 10 in a configuration in which the distal arm member 24 is fully extended from out of the stowage slot 30. In both of these Figures, the longitudinal axis 31 of the distal arm member 24 is parallel or substantially parallel to the longitudinal axis 23 of the proximal arm member 20 (necessarily so in the position of the tablet arm 10 shown in FIG. 13, since the distal arm member 24 is telescopically stored within the concealed portion 226 of the stowage slot 30 in the proximal arm member 20). In this "first phase" of adjustability, the effective length 222 of the arm assembly 12 (i.e., as measured from the proximal end 21 of the proximal arm member 20 to the distal end 28 of the distal arm member 24, see FIGS. 1 and 14) is adjustable by telescopically extending or retracting the distal arm member 24 relative to the stowage slot 30 in the proximal arm member 20 a desired distance. In this first phase, rotation of the tablet arm 10 about the axes 124,125 of the proximal joint 14 is possible (unless freedom about the axis 125 has been intentionally prevented via use of the post 218, as noted above).

In a "second phase" of adjustability, after the distal arm member 24 has been fully extended out of at least the concealed portion 226 of the stowage slot 30 in the proximal arm member 20, the distal arm member 24 can be rotated about the medial joint 16 (via depression of the push button 78, as described above) so that the longitudinal axis 31 of the distal arm member 24 is not parallel or substantially parallel to the longitudinal axis 23 of the proximal arm member 20. In this second phase, the entire tablet arm 10 may be rotated about the axes 124,125 of the proximal joint 14 (unless freedom about the axis 125 has been intentionally prevented via use of the post 218, as noted above), and the distal arm member 24 may be rotated about the axis 122 of the medial joint 16 in the manner described above.

Figure 14:
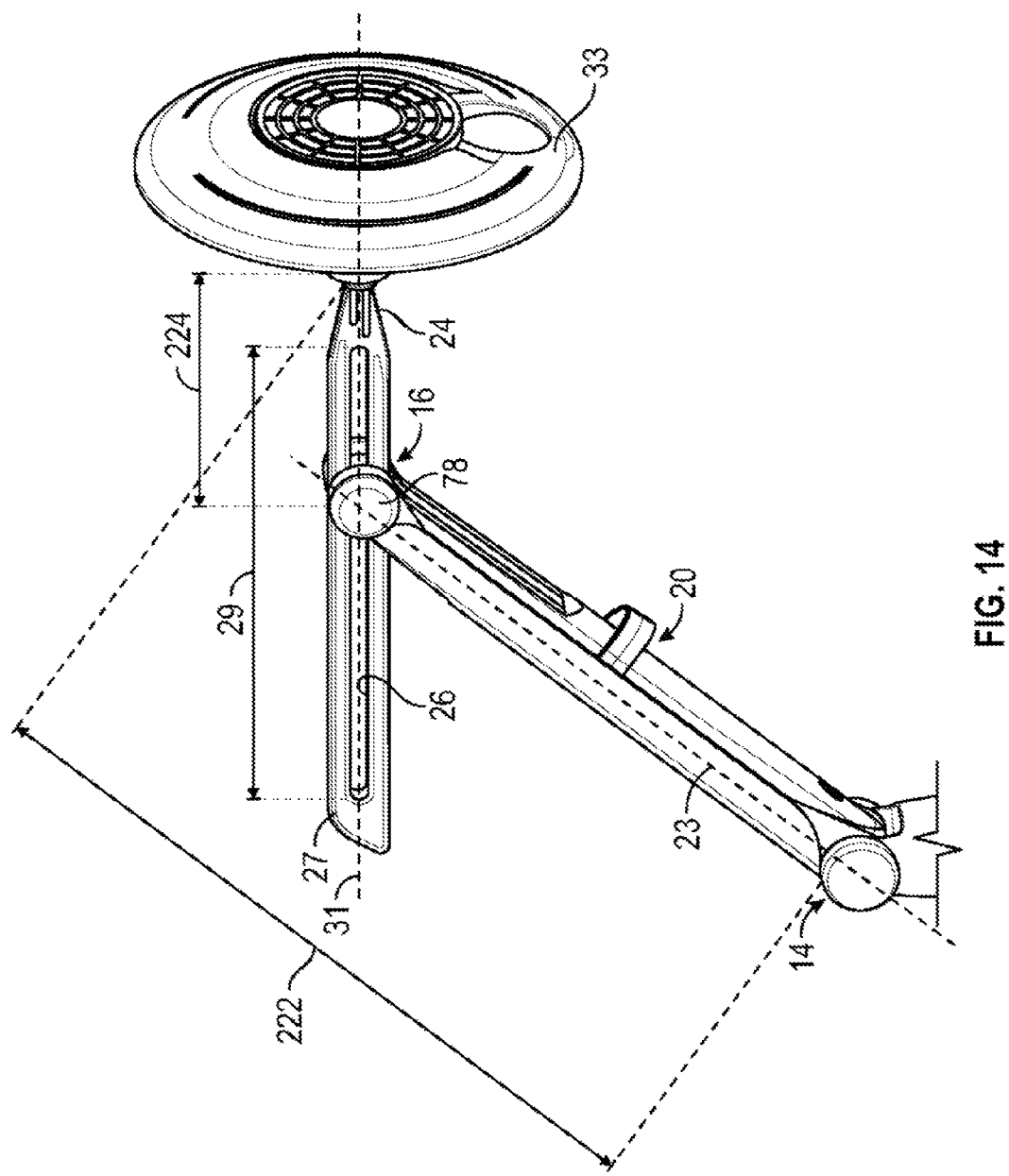
FIG. 14 is a partial view of the tablet arm of FIG. 1, showing the tablet arm in a configuration in which the distal arm member has been fully extended from within the proximal arm member and is located non-parallel to the proximal arm member with its effective length reduced.

In a "third phase" of adjustability, while the longitudinal axis 31 of the distal arm member 24 is oriented such that is not parallel or substantially parallel to the longitudinal axis 23 of the proximal arm member 20, the effective length 224 of the distal arm member 24 (i.e., as measured between the medial joint 16 and the distal end 28 of the distal arm member 24, see FIG. 14) can be adjusted by sliding the distal arm member 24 along the length 29 of the slot 26 vis-à-vis the medial joint 16, without sliding any part of the distal arm member 24 into the concealed portion 226 of the stowage slot 30 formed in the proximal arm member 20. It is not necessary to depress the push button 78 in order to adjust the effective length 224 of the distal arm member 24. In this third phase of adjustability, the effective length of the arm assembly 12 of the tablet arm 10 can be changed without stowing the distal arm member 24 within the concealed portion 226 of the stowage slot 30 located in the proximal arm member 20. Moreover, in this third phase of adjustability, the entire tablet arm 10 may be rotated about the axes 124,125 of the proximal joint 14 (unless freedom about the axis 125 has been intentionally prevented via use of the post, as noted above), and the distal arm member 24 may be rotated about the axis 122 of the medial joint 16 in the manner described above. FIG. 14 shows a configuration of the tablet arm 10 in which the distal arm member 24 has been rotated about the medial joint 16 such that the longitudinal axis 31 of the distal arm member 24 is not oriented parallel or substantially parallel to the longitudinal axis 23 of the proximal arm member 20, and the effective length of the distal arm member 24 has been adjusted by sliding the distal arm member 24 within the slot 26 vis-à-vis the medial joint 16. The tablet arm 10 in accordance with the present invention is thus capable of great adjustability in terms of effective length and positioning.

Although exemplary implementations of the herein described systems and methods have been described in detail above, those skilled in the art will readily appreciate that many additional modifications are possible in the exemplary embodiments without materially departing from the novel teachings and advantages of the herein described systems and methods. Accordingly, these and all such modifications are intended to be included within the scope of the herein described systems and methods. The herein described systems and methods may be better defined by the following exemplary claims.

What is claimed is:

1. An arm comprising:
   a proximal arm member having a first longitudinal axis and a stowage slot located therein, the stowage slot having a concealed portion located at a proximal end of the proximal arm member, the concealed portion being defined by a plurality of channel walls that are collectively circumferentially continuous around the stowage slot along at least a portion of the first longitudinal axis, and
   a distal arm member connected to the proximal arm member by a joint, the distal arm member having a second longitudinal axis, a proximal end, and an extension slot formed therein that is shaped to enable the distal arm to slide along the joint between a fully retracted position and a fully extended position;
   wherein the distal arm member, the joint, and the stowage slot are operationally configured so that the proximal end of the distal arm member is received within the stowage slot and concealed from view within the concealed portion of the stowage slot when the distal arm member is slid along the joint from the fully extended position to the fully retracted position while the second longitudinal axis is substantially parallel to the first longitudinal axis; and wherein the distal arm member, the joint, and the stowage slot are operationally configured so that the proximal end of the distal arm member is not received within the stowage slot when the distal arm member is slid along the joint from the fully extended position to the fully retracted position while the second longitudinal axis is not substantially parallel to the first longitudinal axis.

2. The arm of claim 1, further comprising a mount for securing the arm to a support surface, the mount being connected to a proximal end of the proximal arm member, the proximal end being located opposite the joint.

3. The arm of claim 1, wherein the extension slot is located through the distal arm member and has a length having an axis that is parallel to the second longitudinal axis.

4. The arm of claim 1, wherein the joint has a locked position in which the second longitudinal axis is not adjustable relative to the first longitudinal axis, and an unlocked position in which the second longitudinal axis can be rotated relative to the first longitudinal axis.

5. The arm of claim 1, wherein the joint comprises a shaft having an axis that is perpendicular to both the first longitudinal axis and the second longitudinal axis.

6. The arm of claim 1, wherein a distal end of the distal arm member that is located opposite the proximal end of the distal arm member further comprises a device mount for releasably supporting an electronic device therefrom.

7. The arm of claim 1, wherein the device mount comprises a magnet and an attachment disc comprised of a ferrous metal.

8. An adjustable supporting arm, the arm comprising:
a proximal arm member that is connectable to a support mount or base, the proximal arm member having a longitudinal axis and a stowage slot located therein, the stowage slot being defined by a plurality of channel walls that are collectively circumferentially continuous therearound along at least a portion of the longitudinal axis, and
a distal arm member that is connected to the proximal arm member by a joint, the distal arm member having a longitudinal axis, wherein the joint has a locked position in which the longitudinal axis of the distal arm member is not adjustable relative to the longitudinal axis of the proximal arm member, and an unlocked position in which the longitudinal axis of the distal arm member can be rotated relative to the longitudinal axis of the proximal arm member, the joint comprising a push button in engagement with a compression spring, wherein the joint is convertible from its locked position to its unlocked position by applying a force to the push button such that it compresses the compression spring;
wherein in a first phase of adjustability, the distal arm member may be telescopically extended from or retracted into the stowage slot such that the longitudinal axis of the distal arm member remains substantially parallel to the longitudinal axis of the proximal arm member and an effective length of the distal arm member, as measured between the joint and a distal end of the distal arm member, is adjustable;
wherein in a second phase of adjustability, after the distal arm member has been fully extended out of the concealed portion of the stowage slot and the joint has been converted to its unlocked position, the distal arm member may be rotated about the joint so that the longitudinal axis of the distal arm member is not substantially parallel to the longitudinal axis of the proximal arm member; and wherein in a third phase of adjustability, while the distal arm member is oriented such that its longitudinal axis is not oriented substantially parallel to the longitudinal axis of the proximal arm member, the effective length of the distal arm member can be reduced without sliding any part of the distal arm member into the stowage slot.

9. The arm of claim 1, the distal arm member further comprising a distal end opposite to its proximal end, the arm further comprising an attachment assembly attached to the distal end of the distal arm member, the attachment assembly comprising a release plate, a magnet, and an attachment disc comprised of a ferrous metal, the release plate having an outer edge, wherein one of the magnet and the attachment disc is affixed to the release plate and the other of the magnet and the attachment disc includes a mounting surface that lies in a plane, the outer edge of the release plate being spaced apart from the plane.

10. The arm of claim 9, wherein the attachment assembly is attached to the distal end of the distal arm member by at least one ball and socket joint.

11. The arm of claim 9, wherein the release plate has a front side that is at least partially convex, the front side facing the plane.

12. The arm of claim 9, wherein the release plate has a recess which is sized and shaped to accommodate the magnet and attachment disc therein.

13. The arm of claim 4, the joint further comprising a push button in engagement with a compression spring, wherein the joint is convertible from its locked position to its unlocked position by applying a force to the push button such that it compresses the compression spring.

14. The arm of claim 13, wherein removing the force from the push button converts the joint from its unlocked position to its locked position.

15. The arm of claim 8, the stowage slot having a concealed portion located at a proximal end of the proximal arm member, wherein in the first phase of adjustability, when the distal arm member is fully retracted into the concealed portion of the stowage slot, a proximal end of the distal arm member is concealed from view within the concealed portion.

16. The arm of claim 8, the arm further comprising an attachment assembly attached to the distal end of the distal arm member, the attachment assembly comprising a release plate, a magnet, and an attachment disc comprised of a ferrous metal, the release plate having an outer edge, wherein one of the magnet and the attachment disc is affixed to the release plate and the other of the magnet and the attachment disc includes a mounting surface that lies in a plane, the outer edge of the release plate being spaced apart from the plane.

17. The arm of claim 16, wherein the attachment assembly is attached to the distal end of the distal arm member by at least one ball and socket joint.

18. The arm of claim 16, wherein the release plate has a front side that is at least partially convex, the front side facing the plane.

19. The arm of claim 16, wherein the release plate has a recess which is sized and shaped to accommodate the magnet and attachment disc therein.

20. An arm for supporting an electronic device, the arm comprising:
a proximal arm member that is connectable to a support mount;
a distal arm member connected to the proximal arm member by a first joint, wherein a length of the distal arm member as measured from the first joint to a distal end of the distal arm member is adjustable, the distal arm member being at least partially stowable within the proximal arm member in some configurations of the arm;

an attachment assembly comprising a release plate and an attachment disc comprised of a ferrous metal, the attachment assembly being connected to the distal arm member by a second joint, the attachment disc being located within a recess located in a front side of the release plate;

a magnet assembly that is attachable to a rear side of the electronic device, the magnet assembly comprising a magnet, the magnet assembly being sized and shaped to fit within the recess;

wherein when the magnet assembly is attached to the rear side of the electronic device and placed within the recess, a magnetic force between the attachment disc and the magnet is developed that is sufficient to hold the magnet assembly and attached electronic device to the arm;

wherein a portion of the release plate angles away from the rear side of the electronic device such that a gap is formed between a front side of the portion of the release plate and the rear side of the electronic device, and the magnet assembly and attached electronic device are removable from the arm by, with one hand, contacting during the same period of time both a front side of the electronic device opposing the rear side thereof and a rear side of the second portion of the release plate opposing the front side thereof, and moving at least a portion of the rear side of the electronic device into the gap such that the strength of the magnetic force between the attachment disc and the magnet is reduced to a point where the electronic device is removable from the arm with the one hand.

\* \* \* \* \*